Figure 21:
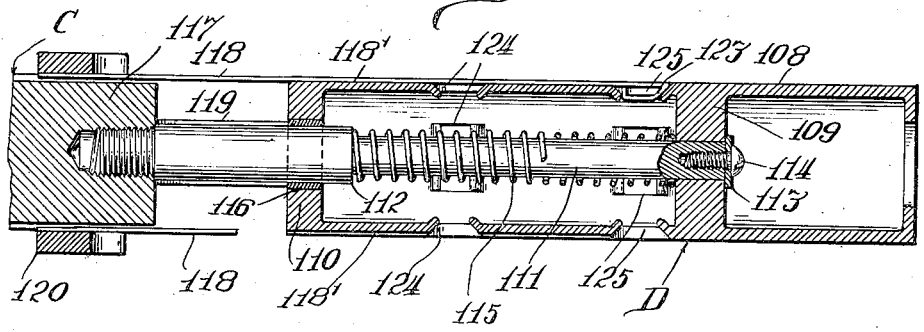

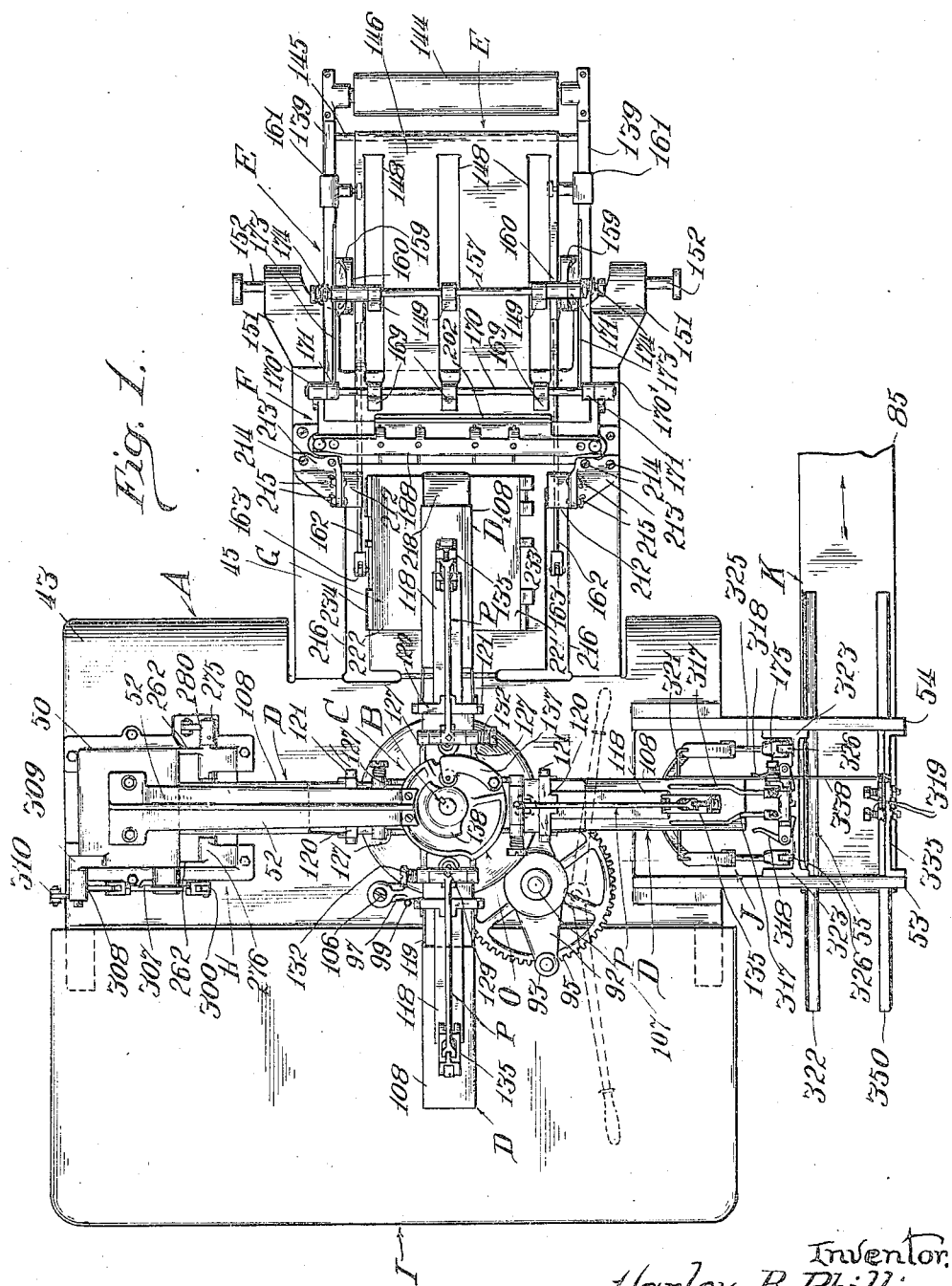

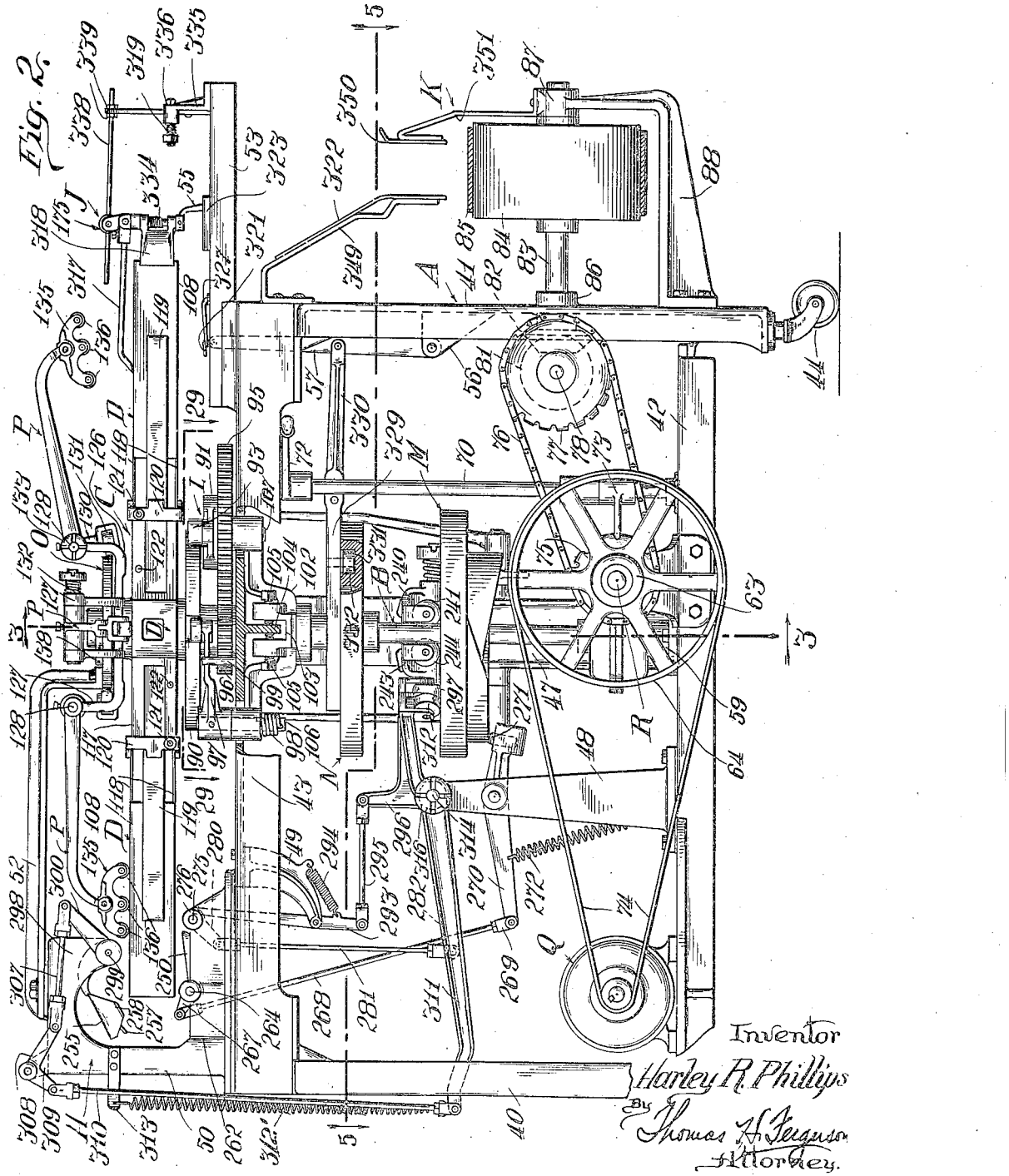

Feb. 19, 1929.　　　　　　　　　　　　　　　　　　1,702,704
H. R. PHILLIPS
POWER DRIVEN CONTAINER FORMING MACHINE
Filed May 3, 1926　　　　13 Sheets-Sheet 3
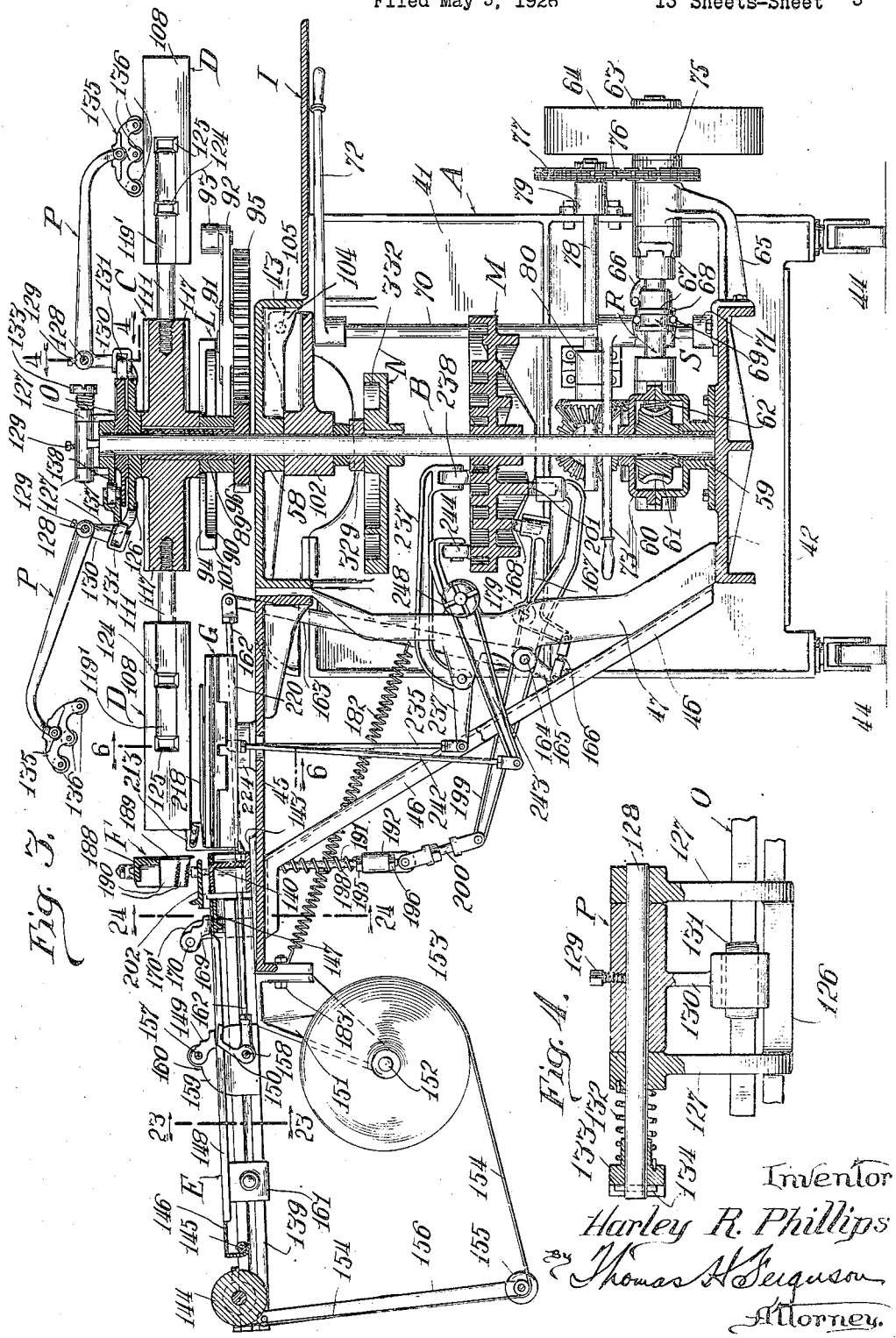
Inventor
Harley R. Phillips
By Thomas H. Ferguson
Attorney.

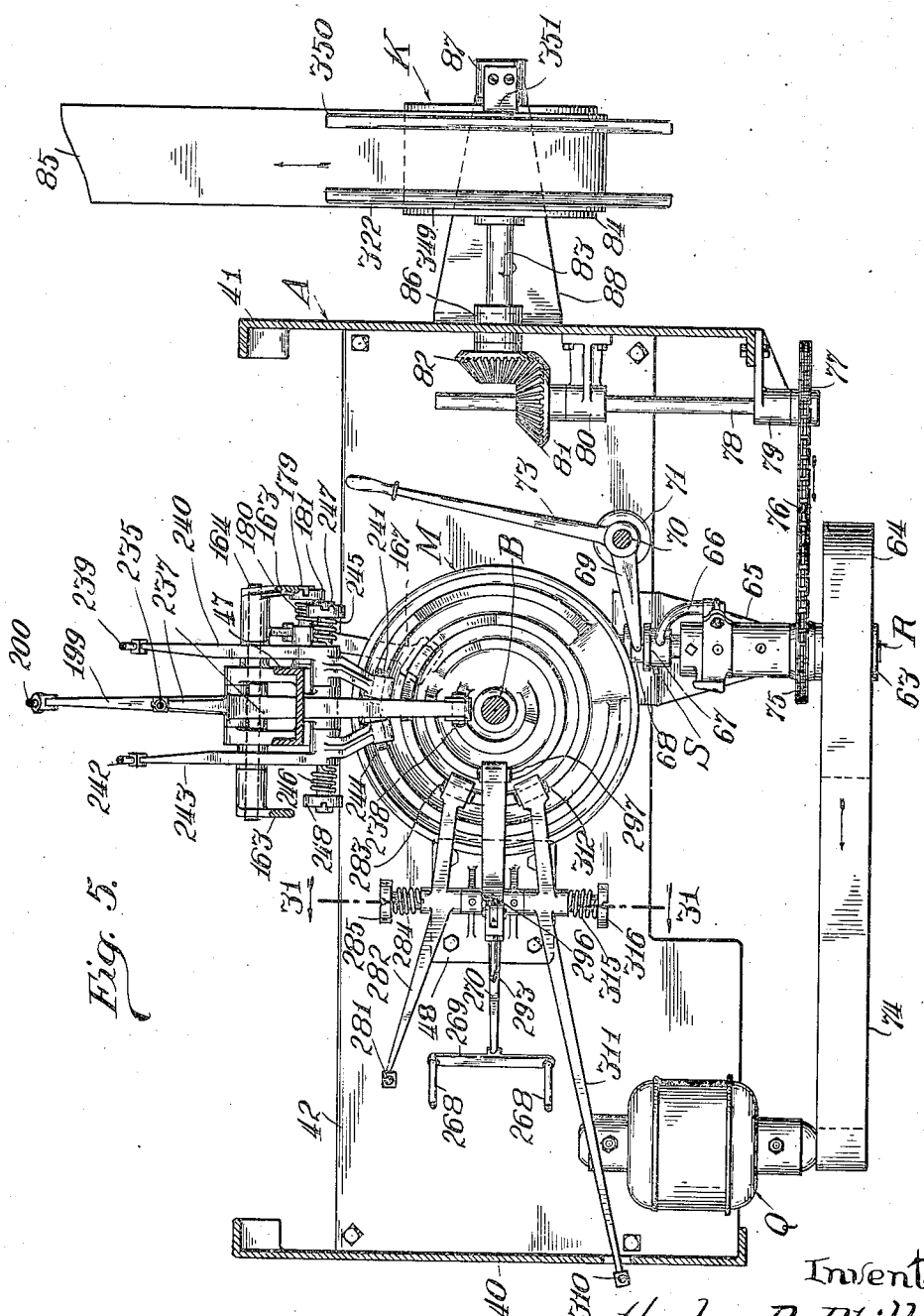

Feb. 19, 1929.
H. R. PHILLIPS
1,702,704
POWER DRIVEN CONTAINER FORMING MACHINE
Filed May 3, 1926   13 Sheets-Sheet 5
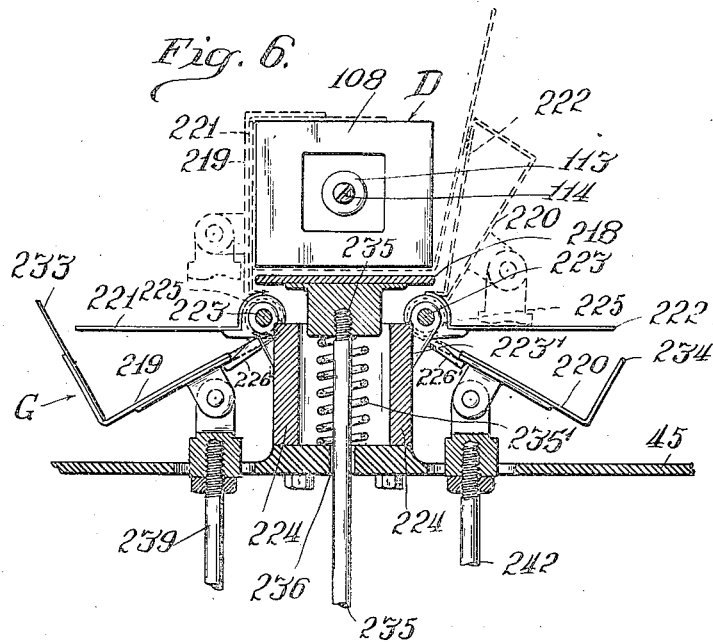
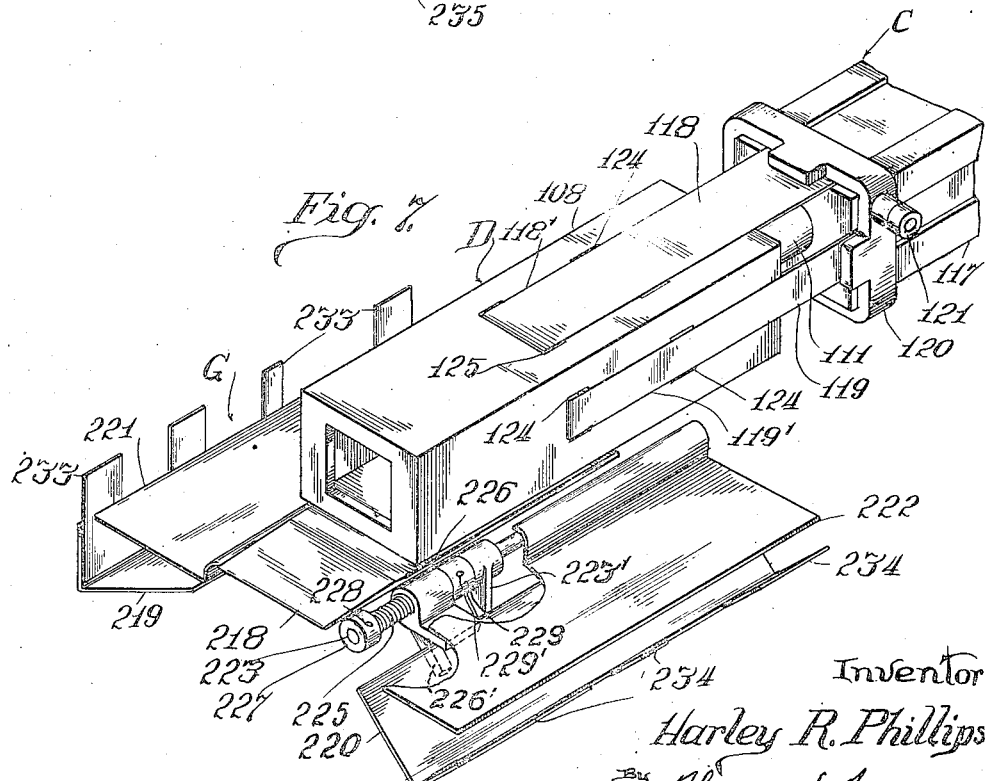
Inventor
Harley R. Phillips
By Thomas H. Ferguson
Attorney.

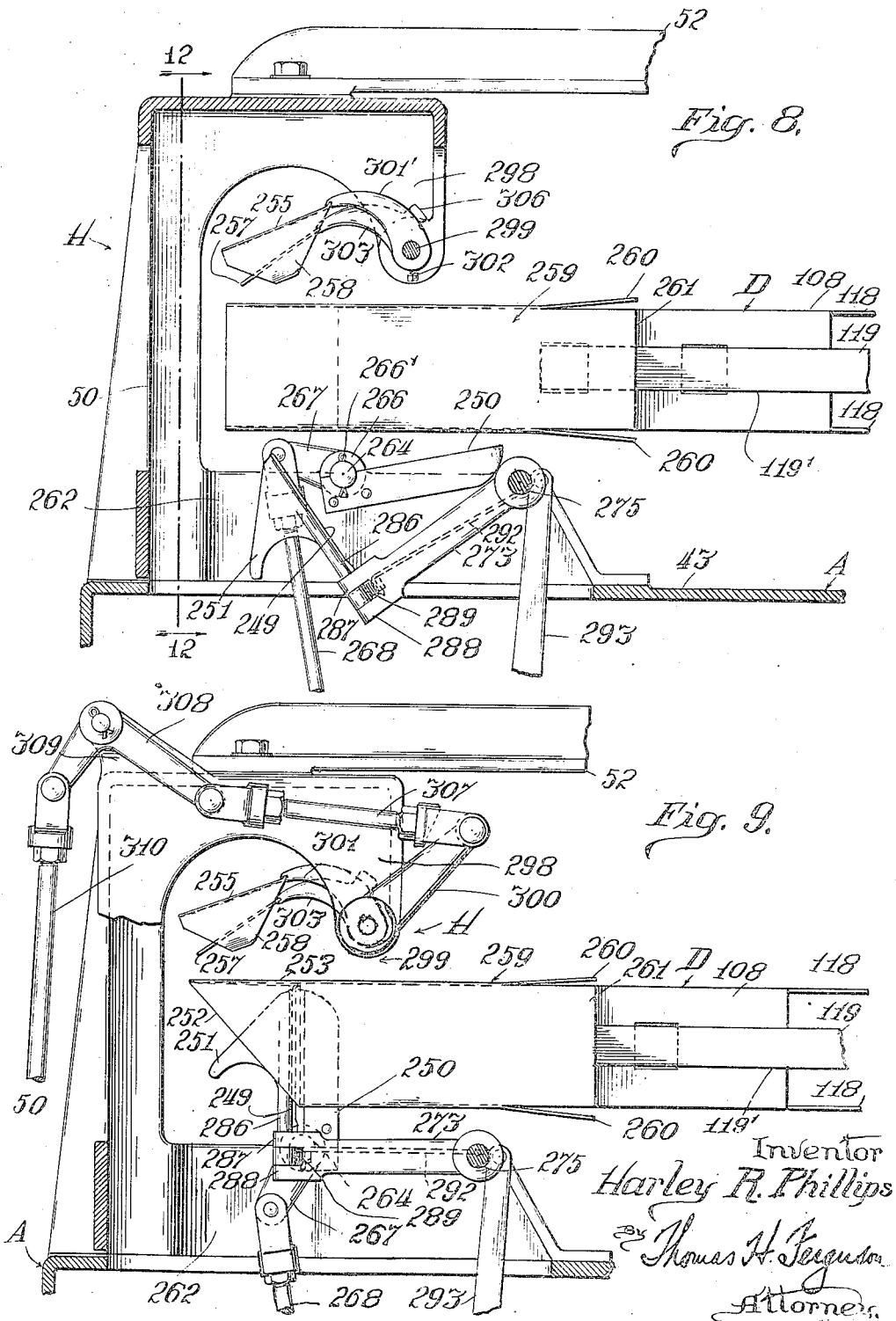

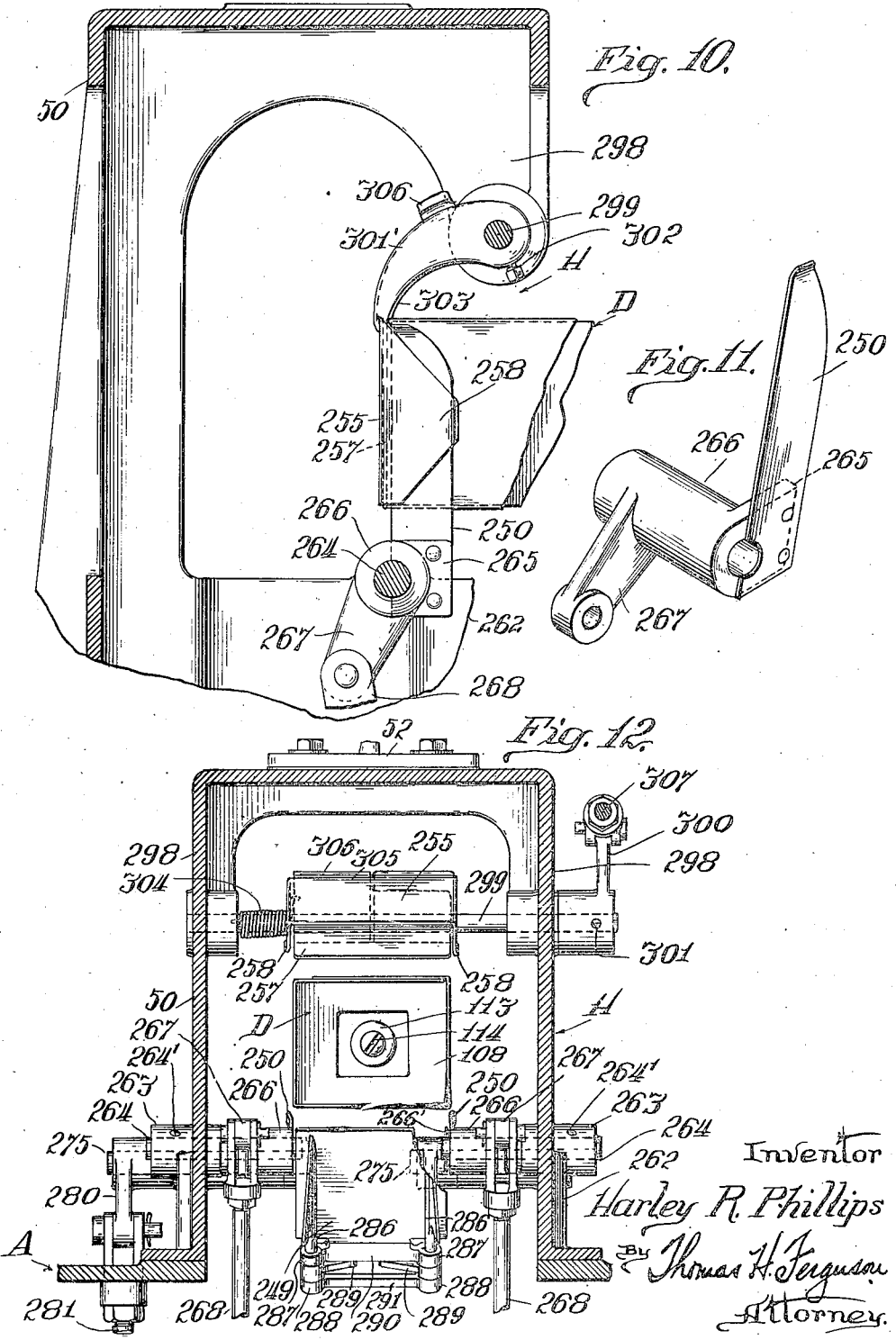

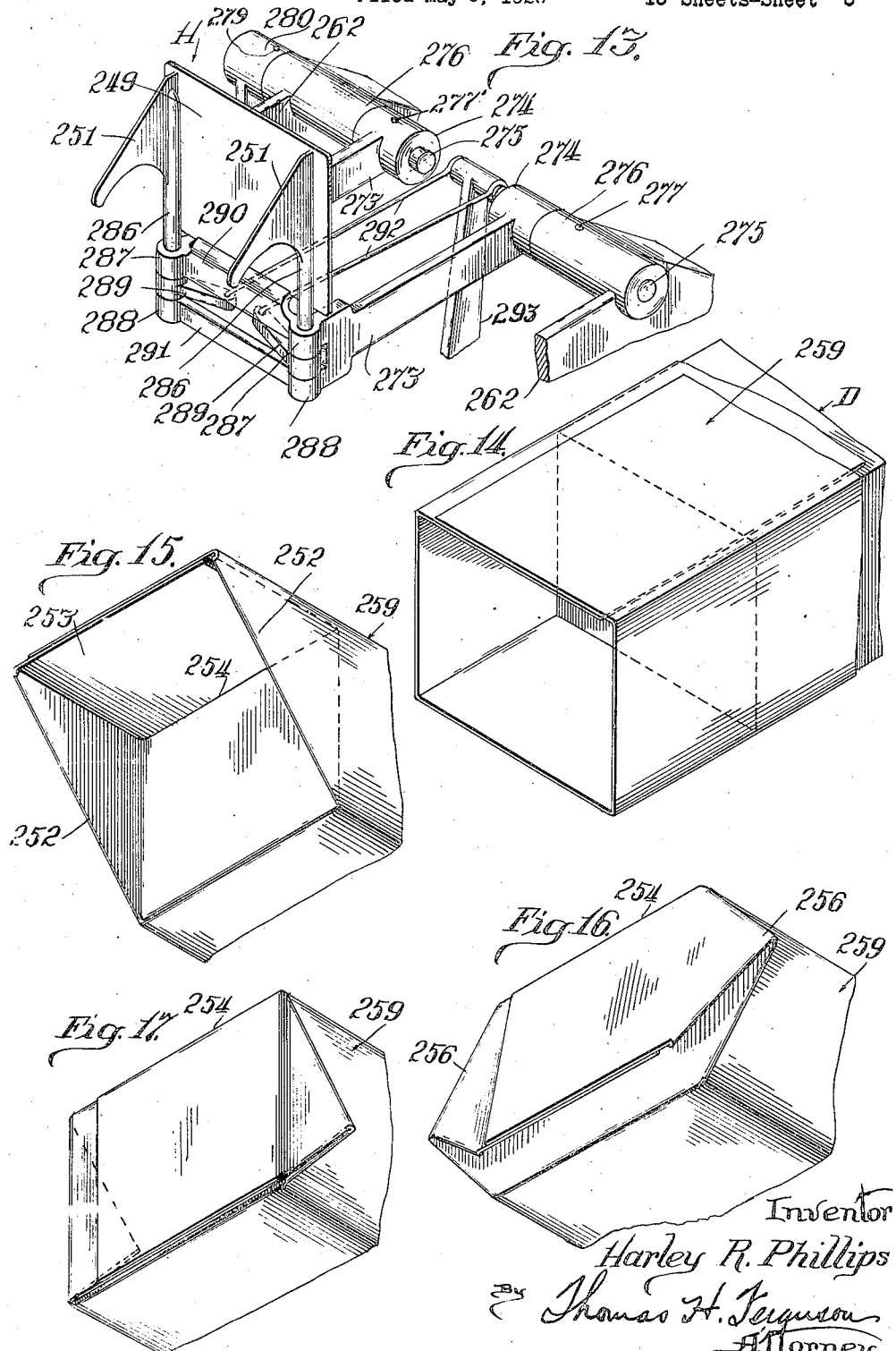

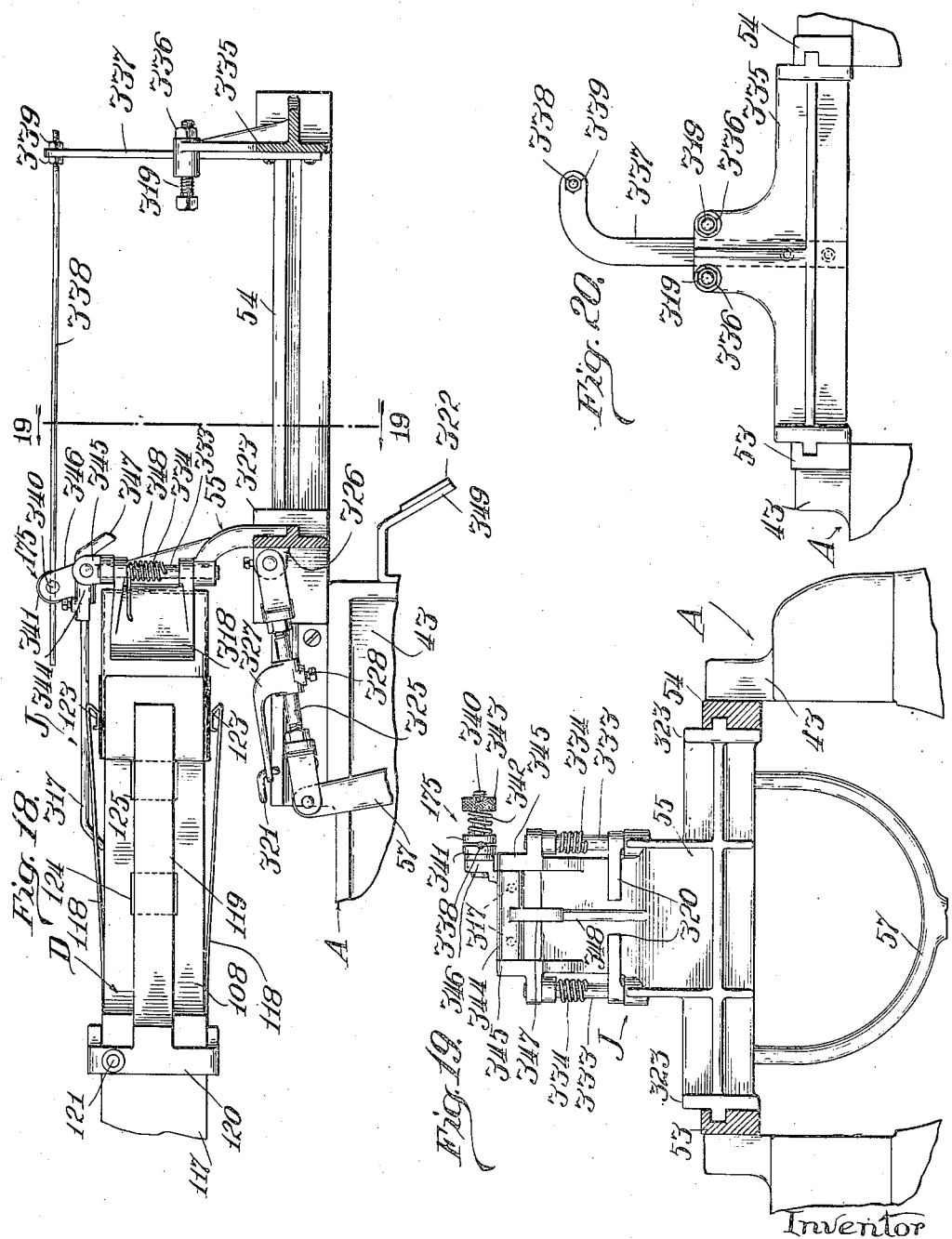

Inventor
Harley R. Phillips
By Thomas H. Ferguson
Attorney

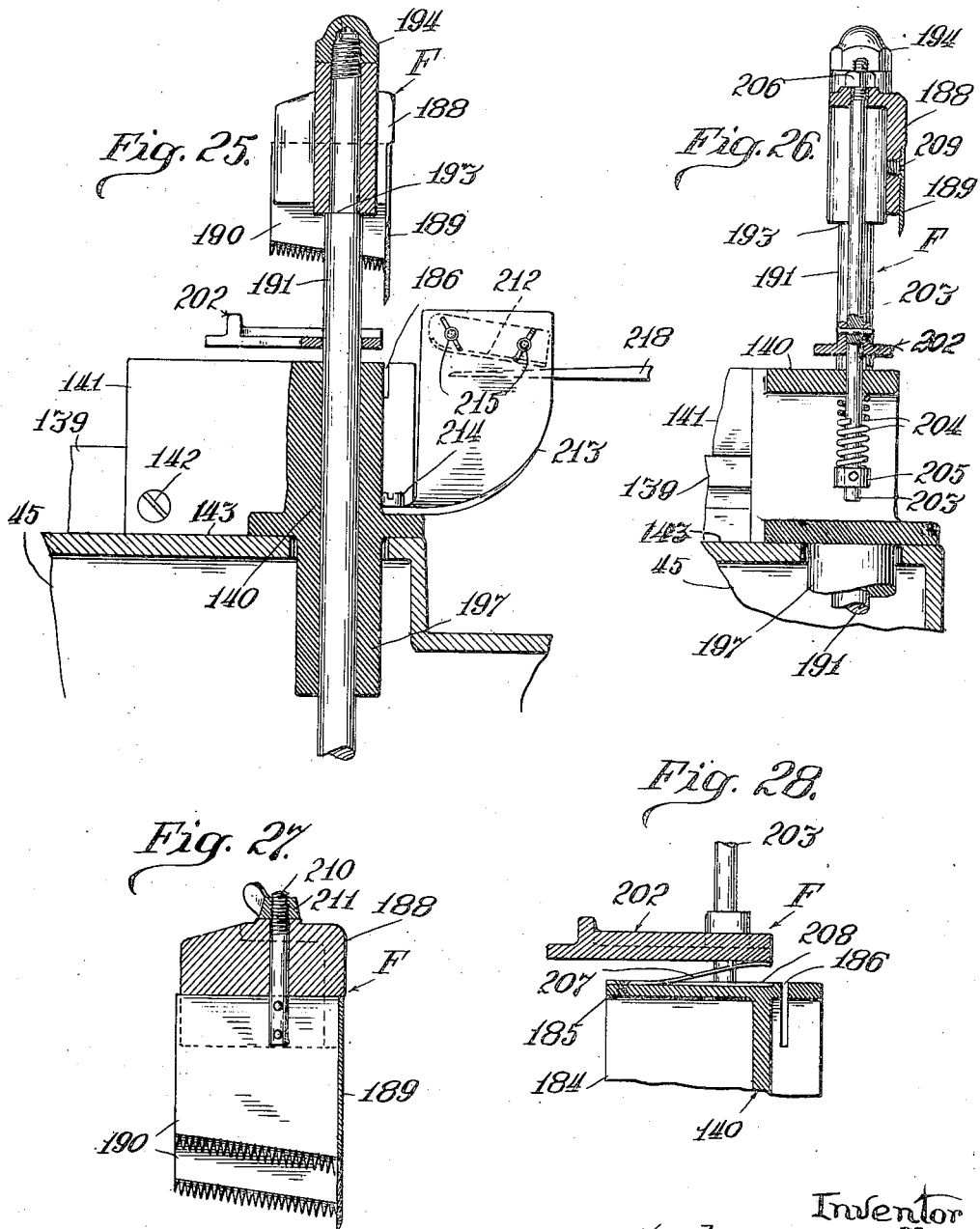

Feb. 19, 1929.  
H. R. PHILLIPS  
1,702,704  
POWER DRIVEN CONTAINER FORMING MACHINE  
Filed May 3, 1926   13 Sheets-Sheet 13
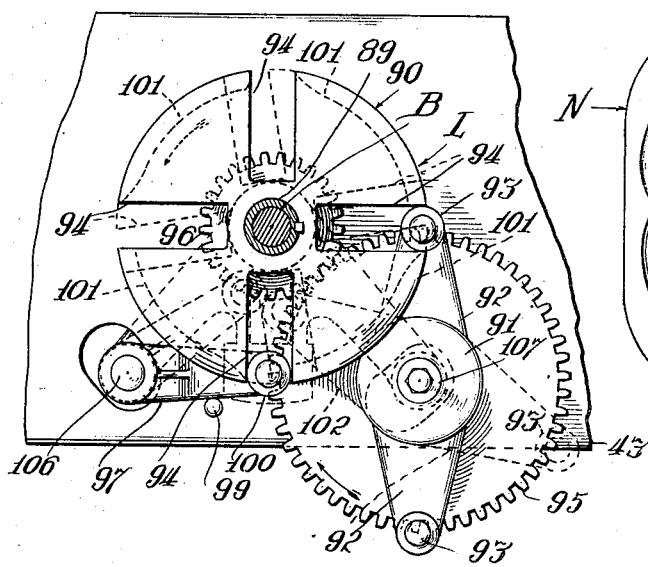
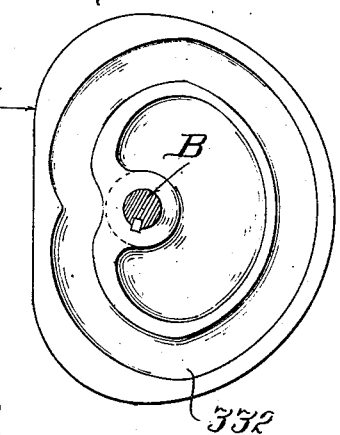
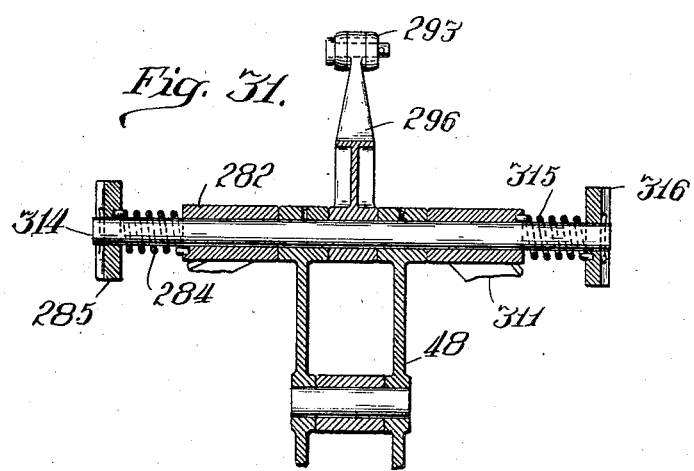
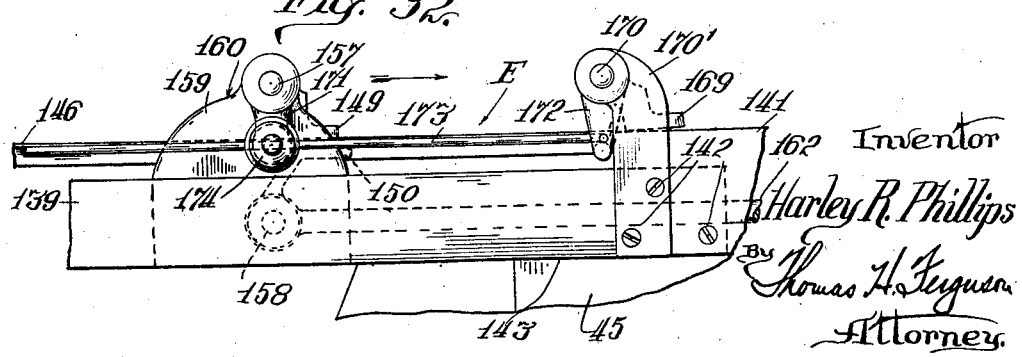
Inventor  
Harley R. Phillips  
By Thomas H. Ferguson  
Attorney.

Patented Feb. 19, 1929.

1,702,704

UNITED STATES PATENT OFFICE.

HARLEY R. PHILLIPS, OF OAK PARK, ILLINOIS, ASSIGNOR TO MOJONNIER BROS. CO., A CORPORATION OF ILLINOIS.

POWER-DRIVEN CONTAINER-FORMING MACHINE.

Application filed May 3, 1926. Serial No. 106,248.

The present invention relates to machines for making containers, and especially to machines of this class which are power driven in contrast to so-called hand machines wherein the operations are performed by hand or through the employment of pedal arrangements, such as disclosed, for example, in my prior Patent No. 1,528,073, dated March 3, 1925.

The present invention is directed to the making of containers of the same kind as those mentioned in said patent. As there pointed out, in the handling of certain lines of manufactured commodities, such as ice cream, it is usual to place the commodity in a lined carton or box. The cartion itself is composed of substantial material so that it will not collapse in service while the container therein, commonly called a "liner", is composed of lighter material, such as parchment paper, which is impervious to the moisture of the contained commodity.

It must be understood that the present invention is capable of general use in the forming of containers, although I have chosen in the present instance to disclose the same in an embodiment especially intended for the making of liners.

The principal object of the invention is to produce a power driven container forming machine which will be simple and effective in its forming operations, and at the same time simple in construction with its various parts located so as to be readily accessible for repair or replacement, and likewise capable of being constructed and maintained economically. Another object is to provide a machine which will make a container of simple construction having smooth interior walls so that when used for holding ice cream a neat brick will be produced. Another object is to provide a machine which will perform all its functions with power received from a motor or other prime mover and wherein the only hand operation will be that of applying the carton to the liner at one position of the machine.

In devising a machine to meet these objects, I preferably employ forming blocks movable into a series of positions in which certain operations take place, such as wrapping the blank about the block, folding up its end to form the bottom of the container, applying the carton, bending back the flaps and discharging the finished lined carton from the machine. In the specific embodiment herein disclosed there are four such positions. In the first, the blank is wrapped about the block to form the sides of the container; in the second, one end of the blank is folded against the end of the block to form the bottom of the container; in the third, occurs the hand operation of slipping a carton over the container on the block; and in the fourth, the flaps on the liner are bent back and the lined carton is ejected from the machine upon a conveyor. Feeding and cutting mechanism supply blanks cut from a roll of the liner material and fed to the first position of the machine.

The various features of the invention include the cutting and feeding mechanisms for supplying the blanks, the holding and wrapping members at the first position, the end folding members at the second position, the novel clamping means by which a carton may be slipped in place under a clamping member in the third position, the flap bending mechanism and ejecting mechanism in the fourth position, the construction of the block and flap folders by which they may be adjusted for containers of different sizes, the delivery of the finished carton from the machine to a conveyor, the novel arrangement of the parts of the machine as a whole, and other features, all of which will more fully appear upon consideration of the following detailed description taken in connection with the accompanying drawings, while the scope of the invention will be particularly pointed out in the appended claims.

Figure 22:
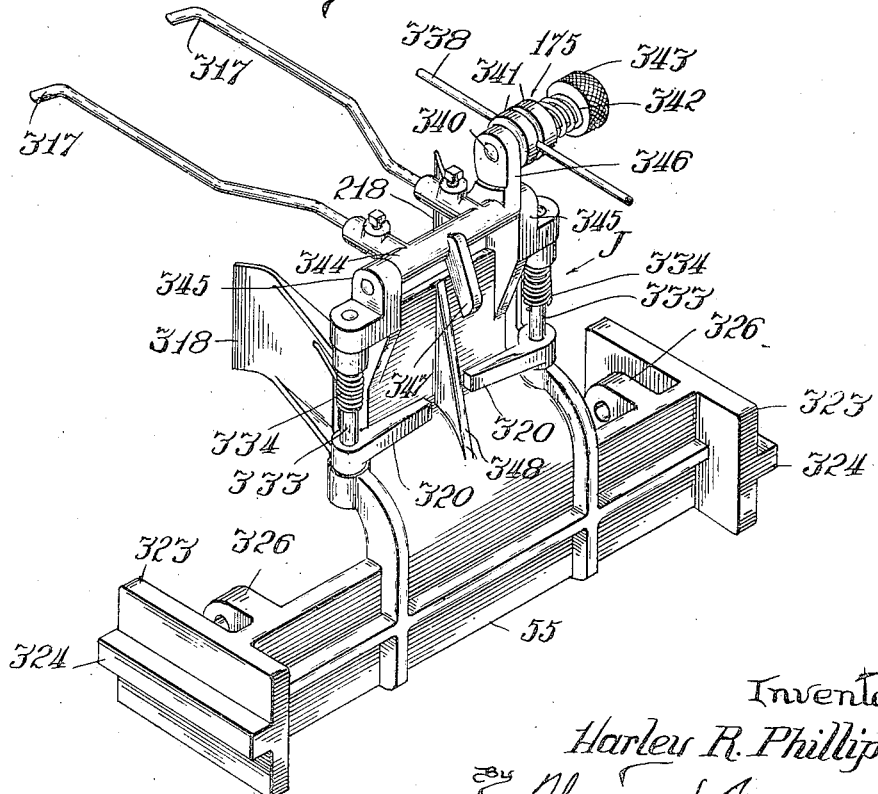
Figure 23:
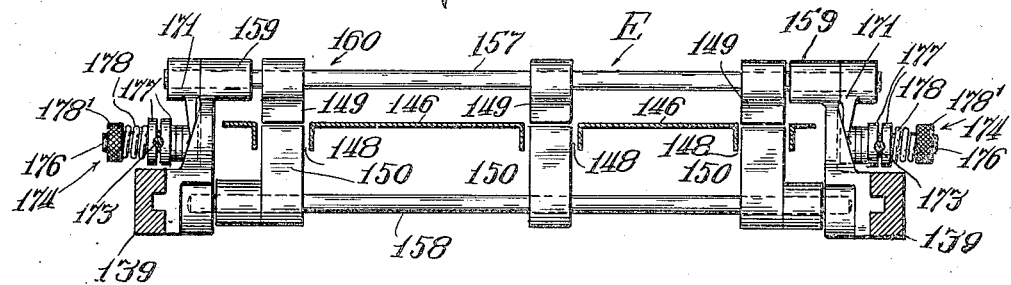
Figure 24:
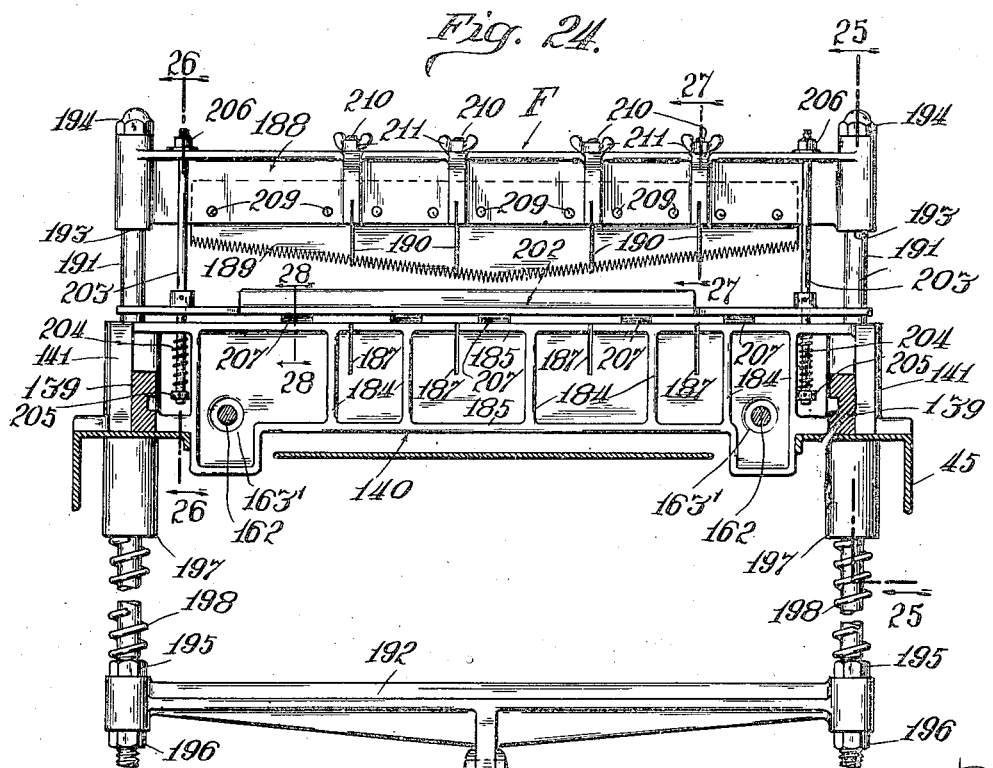

In said drawings, Fig. 1 is a plan view of a machine constructed in accordance with the present invention; Fig. 2 is a side elevation of the same viewed from the side where the carton is manually applied to the forming block; Fig. 3 is a central vertical section through the machine, taken on a plane indicated by the line 3—3 of Fig. 2; Fig. 4 is a partial sectional view illustrating the mounting of one of the clamping members which cooperate with the forming blocks to hold the blanks in wrapped position thereon, the plane of section being indicated by the line 4—4 of Fig. 3; Fig. 5 is a horizontal section taken through the machine on a plane indicated by the line 5—5 of Fig. 2; Fig. 6 is a transverse section through a forming block and the associated blank wrapping members at the first position, the plane of section being indicated by the line 6—6 of Fig. 3; Fig. 7 is a perspective view of the same forming block and associated members, parts being broken away to show how the members are mounted; Fig. 8 is a side elevation of a forming block and the associated members at the second position where the end of the blank is folded up to form the bottom of the container; Fig. 9 is a similar view illustrating the end forming elements in an advanced position where the first fold is made against the end of the block; Fig. 10 is a view similar to Fig. 8 but illustrating the last folding operation which takes place at the second position; Fig. 11 is a perspective view of one of the side blades, and its mounting, which comes into play in the end forming position of the forming block; Fig. 12 is a transverse section of the mechanism at the second position of the machine illustrating certain parts in elevation, the plane of section being indicated by the line 12—12 of Fig. 8; Fig. 13 is a perspective view of the end forming member which performs the first folding operation illustrated in Fig. 9, together with the wings which start the downward fold of the upper portion of the blank; Fig. 14 is a perspective view of a forming block with a blank in position thereon at the time it leaves the first position of the machine and before the end forming folds have been begun; Fig. 15 is a perspective view taken from the under side of the same block and blank after the first folding operation, that of Fig. 9, is performed; Fig. 16 is a similar perspective view of the blank after the wings of Fig. 13 have been moved outward to start the downward fold of the upward portion of the blank; Fig. 17 is a perspective view which illustrates the next step, namely, that where the folded end has been pressed against the end of the block in the manner illustrated in Fig. 10; Fig. 18 is a side elevation of a forming block and the associated flap bending and ejecting mechanism found at the fourth position of the machine; Fig. 19 is an end view of the mechanism of Fig. 18, a few of the parts being shown in section taken on a plane indicated by the line 19—19 of Fig. 18; Fig. 20 is an end view of the support shown at the right in Fig. 18; Fig. 21 is a longitudinal section of a forming block, its supporting arm, and a slidable connection between the two; Fig. 22 is a perspective view of the movable parts of the withdrawing and ejecting mechanism located at the fourth position of the machine; Fig. 23 is a transverse plane through the feed table and associated parts of the feeder located adjacent to the first position of the machine, the plane of section being indicated by the line 23—23 of Fig. 3; Fig. 24 is an elevation of the cutter mechanism located at the end of the feed table adjacent to the first position of the machine, certain parts being shown in section indicated by the line 24—24 of Fig. 3; Fig. 25 is a longitudinal section through the cutter, the plane of section being indicated by the line 25—25 of Fig. 24; Fig. 26 is a longitudinal section through the cutter taken at another point, namely, that indicated by the line 26—26 of Fig. 24; Fig. 27 is still another section through the cutter taken on a plane indicated by the line 27—27 of Fig. 24; Fig. 28 is a longitudinal section illustrating particularly the clamping member and guiding clips for the web of material to be clamped and cut, the plane of section being indicated by the line 28—28 of Fig. 24; Fig. 29 is a plan view of the Geneva movement employed in the machine to give the forming blocks the requisite intermittent motion from position to position, the main shaft being shown in section indicated by the line 29—29 of Fig. 2; Fig. 30 is a plan view of the actuating cam for the flap folding and carton ejecting mechanism of the fourth position of the machine; Fig. 31 is a vertical section through certain of the cam operated members by which the end folding operations of position two are accomplished, the plane of section being indicated by the line 31—31 of Fig. 5; and Fig. 32 is a side elevation of a portion of the feed mechanism illustrating particularly the grippers that engage the web of sheet material to advance it to the cutter. Throughout these views like characters refer to like parts.

In said drawings, A designates the frame of the machine generally, B the main shaft, C the head, D the forming blocks carried by the head, E the feeder, located so as to feed the lining material to the first position of the machine, F the cutter for cutting off the blanks from the web of lining material thus fed, G the mechanism by which the blank is wrapped around the forming block at the first position of the machine, H the mechanism at the second position by which the end of the blank is folded against the end of the forming block to form the end of the bottom of the container, I the table at the third position where the carton is manually slipped over the container on the block, J the flap folding and carton ejecting mechanism at the fourth position, and K the conveyor into which the finished lined cartons are discharged. In addition to these parts, L designates the Geneva movement by which the head C is rotated from the shaft B. M the cam member by which the connections with the folding members at positions one and two are operated, N the cam member by which the discharge mechanism at position four is operated, and O the cam by which the clamping arms P are actuated; and Q designates the motor which drives the main shaft B through a drive shaft R controlled by a clutch S.

The frame A is a box like structure comprising end panels 40, 41, a bottom 42, and a top 43. These parts are preferably castings secured together in any preferred way. The end panels are provided with casters 44 by which the entire machine may be readily moved about. The top 43 has connected to one of its flanges an extension top 45 which is supported at its outer edge by inclined braces 46. The top 45 is located at the feeding side of the machine. The lower ends of the braces 46 are connected to an inclined face of an irregularly shaped post 47 which extends between the bottom 42 and top 43. It is this member 47 that carries the bearings for the cam levers and other parts that operate the feeder E, cutter F, and folding mechanism G. The bottom 42 is also provided with a standard 48 which provides bearings for the cam operated levers which have to do with the end folding mechanism H located at the second position of the machine. For supporting certain of these parts at the second position a downwardly extending bracket 49 is also provided. This bracket, as clearly shown, is secured to the under side of the top 43. In addition to these parts at the second position, is a box like frame 50 which provides bearings for several of the parts of the folding mechanism H. The frame 50 also serves to support a radial frame member 52 which extends to the center of the machine and rigidly supports the stationary cam O which forms a sort of auxiliary bearing for the main shaft B. At the fourth position of the machine the frame A is provided with two track members 53, 54, on which the reciprocating member 55 of the flap folding and carton ejecting mechanism J operates. The end panel 41 of the frame A is also provided with a bracket 56 for pivotally supporting a yoke 57 of the same mechanism.

The main shaft B, besides finding a bearing in the stationary cam O as previously noted, is provided with a bearing 58 in the top 43, and a bearing 59 upon the bottom frame member 42. Adjacent to the latter and within a casing 60 is a worm gear wheel 61 keyed to the shaft B and cooperating with a worm 62 upon shaft R. The latter has a bearing at one end in the casing 60, and at the other end extends through a sleeve 63 upon which a pulley 64 is located. The sleeve 63 is journaled in a bearing in a bracket 65 which extends outward from the bottom 42 of the frame. The shaft R and sleeve 63 are connected and disconnected by the clutch S. This clutch may be of any desired construction, but in the present instance is of the band type, actuated by a lever 66 which is moved into and out of clutching position by a cam face 67 on a sleeve 68 which is under the control of a yoke 69. The latter is bifurcated at one end and engages a groove in the sleeve 68 in the usual manner; at its other end it is keyed to a vertical rod 70 which is journaled at its lower end in a bearing block 71 on the bottom 42, and at its upper end in an opening in the top 43 of the frame. For rotating the rod to move the clutch into and out of clutching position, a hand lever 72 is secured to the rod 70 near its upper end and extends outward under the table I in a position to be readily grasped by the machine attendant who is ordinarily busy at this position applying cartons to the container covered blocks D, as they pass into and out of the third position of the machine. In addition to the lever 72, I also preferably provide a lever 73 located near the bottom of the rod 70 and extending toward the other side of the machine, so that the attendant when on that side of the machine may be able to start it or stop it at will. The pulley 64 is lined up with the pulley of the motor Q and is driven from the latter by a belt 74, the direction of travel of the belt being indicated by the arrow adjacent thereto in Fig. 2. As clearly shown, the motor Q is mounted on the bottom 42 of the frame A.

In addition to driving the main shaft B, I also provide for driving the belt of the conveyor K located at the fourth position of the machine. For this purpose the sleeve 63 on shaft R is provided with a sprocket 75 and this cooperates with a belt 76 which passes over a sprocket 77 on a horizontal shaft 78 journaled in bearings 79, 80, provided on the panel 41 of the machine. The end of the shaft 78 distant from the sprocket 77 is provided with a bevel gear wheel 81 which cooperates with a similar wheel 82 on the inner end of a shaft 83 upon which the pulley 84, which drives the belt 85 of the conveyor K, is located. The shaft 83 finds a bearing 86 at one end in the frame panel 41, and at its other end a bearing 87 in the upper end of a bracket 88 which is secured to the panel 41. It will be seen that the upper stretch of the belt 85 will be moved in the direction indicated by the arrow in Fig. 5, and that it is driven as long as the motor Q is running. In other words, the operation of the conveyor K is independent of the clutch S.

The head or turret C is driven from the shaft B in such a way as to allow it to rest in a series of operative positions. This intermittent motion is provided by the Geneva movement mechanism L. The head C is keyed to a sleeve 89 on the shaft B, and the member 90 of the mechanism L is likewise keyed to the same sleeve. Consequently these two parts move together. The driving member 91 of the mechanism L has two oppositely disposed arms 92 which carry at their outer ends cam rollers 93. The latter cooperate with cam ways in the form of radial slots 94 in the driven member 90. The member 91 is secured to a gear wheel 95 and rotates with it. Gear wheel 95 in turn meshes with a pinion 96 keyed to shaft B. As the shaft rotates the gear wheel 95 moves in the direction indicated by the arrow in Fig. 29, and at regular intervals one of the cam rollers 93 enters the outer end of a slot 94 and moves inward pressing against one wall of the slot and thereby rotating the member 90. This movement continues until the roller 93 again passes out of the same slot. In the present instance four slots 94 are employed and they are arranged 90° apart, as clearly illustrated. With four such slots the mechanism gives a quarter of a turn to the head C for each half revolution of the driving gear wheel 95. It will be seen that there will be some time elapse after one cam roller 93 has left a slot 94 before the next roller 93 will engage the next slot 94. It is during this interval that the head C is left quiescent. During these quiescent periods the several operations upon the liner blank at the different positions of the machine take place. In order to properly center the head C so as to bring the blocks D into proper operative positions, I employ a centering arm 97, Figs. 2 and 29, which is normally spring pressed by a spring 98 into engagement with a stop pin 99. The outer end of the arm 97 carries a roller 100 which is not so high as the roller 93 but is high enough to engage the member 90 near its periphery where the slots have greater depth due to a peripheral flange 101 on the under side of the member 90. During the quiescent periods of the head C, the roller 100 engages the member 90 at the outer end of one of the slots 94, as clearly illustrated in Fig. 29. However, as the driving member 91 advances one of its rollers 93 strikes the roller 100 and shoves it inward out of locking engagement with the member 90 and the latter is started on its rotary movement by the roller 93. When the parts reach the position indicated in dotted lines in Fig. 29, the roller 100 escapes from the roller 93 and under its spring tension moves outward but at this time it can only move outward as far as the flange 101 which it engages. It remains in engagement with this flange until the next slot 94 is reached. Then it moves outward against its stop 99 into locking engagement for that position of the heads. The different heights of the rollers 93 and 100 are illustrated more particularly in Fig. 2. It may often happen in the manufacture of the parts that they will not be made accurately and for this reason it is desirable to have the locking and centering member 97 adjustable. For this purpose I mount the arm 97 and the gear wheel 95 upon a carrier or adjustable member 102 loosely journaled upon the shaft B. The outline of this member 102 is clearly shown in plan in dotted lines in Fig. 29. At an intermediate point the member 102 is provided with a slot 103 which embraces a fin 104 on the under side of the table 43 of the frame A, as illustrated more particularly in Fig. 2. Set screws 105 pass through threaded openings in the walls of the member 102 adjacent to the fin 104, and when the parts are adjusted bear firmly against said fin. By loosening one screw and tightening the other the relative position of the carrier 102 relative to the fin 104 may be changed. This changing of the position of the member 102 will obviously change the positions of the locking member 97 and the driving member 91. This adjustment permits the blocks D to be carefully located over the cooperating mechanisms at the different positions of the machine. The openings in the top 43 of the frame through which the pivot pin 106 of the member 97 and the short shaft 107 of the gear wheel 95 and driving member 91, pass, are elongated somewhat so as to allow for this shifting of the carrier 102 for the different adjustments. It is thus clear that by the mechanism L the shaft B gives an intermittent rotary movement to the head C with quiescent periods for the performance of the several operations at the different positions of the machine. In practice, the gearing is so proportioned that when the machine is in full operation one lined carton is delivered for each revolution of the shaft B. The speed is also such that ample time will be given for the several operations at the different positions. I usually apportion the gearing and regulate the speed so as to produce about twenty-five lined cartons per minute.

The forming blocks D are, in the particular embodiment shown, four in number. Each comprises a rectangular shell 108 having a transverse web 109 and an end wall 110. The web 109 and the wall 110 are each provided with an opening through which extends a rod 111 enlarged at one end to provide a shoulder 112. The forward end of the rod is prevented from rearward movement through the opening in web 109 by a washer 113 which is held in place by a screw 114. A coiled spring 115 surrounds the rod and bears at one end against the rear side of the web 109 and at the other end against the shoulder 112. The effect of this spring is normally to keep the shell 108 in its advanced position, with the web 109 bearing against the washer 113. The opening through the rear wall 110 is provided with a bearing ring 116. The rear end of the rod 111 is secured to the forward end of the arms 117 of the head C. Preferably, the supporting arm 117 is provided with a threaded opening into which the rear end of the rod 111 is screwed. Each block D is provided with flap controlling blades 118, 119. The blades 118 bear against the top and bottom of the block, and the blades 119 against the sides. The blades 118 are slightly wider than the blades 119. These blades are connected at their rear ends to a collar 120 which embraces the supporting arm 117 of the head C, as clearly illustrated in Fig. 7. The collar 120 has on opposite sides spring pressed pins 121 which are adapted to enter holes 122 in the arm 117 to vary the position of the blades upon the block. In the case shown two adjustments are provided. One of these is to take care of blanks for pint cartons, and the other to take care of blanks for quart cartons. The outer ends of the blades 118, 119 are thickened preferably by folding back the end of the strip upon itself in the manner more clearly illustrated in Fig. 18. As there shown, the turned in portion 123 is shaped so as to provide a beveled end which inclines forwardly and outwardly from the block. The thickened outer ends of these blades 118, 119 rest in recesses or openings 124, or 125, when the block is in its normal extended position. As we shall see when examining the apparatus in the fourth position of the machine, these blades 118, 119 pass out of the particular recesses they may be in and act upon the flaps of the lined carton just before the same is delivered from the machine. When the blades 118, 119 have their outer ends resting in the openings 124, the collar 120 occupies its innermost position and the parts are set for quart sizes. When the outer ends of the blades 118, 119 rest in the openings 125 then the parts are set for pint sizes. The blocks D remain in their extended position at all times except when turning the flaps back in this way, at the fourth position of the machine.

The clamping arms P cooperate with the blocks D to hold the blank in place. One such arm is provided for each block. At the center of the machine secured to the head C is a frame 126 having for each arm a pair of uprights 127 which provide bearings at their upper ends for a shaft 128 upon which the inner end of the arm P is secured, preferably by a set screw 129. The inner end of the arm P is in the form of a bell crank lever having a depending arm 130 provided at its lower end with an anti-friction roller 131 which bears upon the periphery of the stationary cam O. By means of this cam the clamping arm P is moved up and down according to the requirements at the different operating positions of the machine. A coiled spring 132 is connected at one end with one of the arms 127, and at its other end with a collar 133 secured by a pin 134 to the shaft 128. The spring 132 is placed under tension so as to yieldingly hold the roller 131 against the edge of the cam O. The outer end of the clamping arm P is provided with a head 135 which is pivoted to the arm P so as to have a free movement through a considerable extent. The head 135 has three rollers 136 mounted between three sets of depending fingers. By reason of the freedom of movement of the head 135 the rollers 136 readily seat themselves upon the block D when brought into contact with it. Having three rollers 136 suits the clamping members to blanks of pint and quart sizes. In operation each clamping member P is brought into contact with its block as soon as a blank has been folded around the block in the first position of the machine, and such clamping member remains pressed against the block from that time on until after the block leaves the third, or carton applying, position; then the arm is raised and remains so until coming down again upon a properly folded blank at the first position. Since the cam O is fixed, it cannot operate on a clamping arm P to cause it to change its position after the associated block has come to rest. In operation the block must come to rest at the first position and have the blank applied to it before the clamping arm P is lowered. Consequently it is necessary to employ means which will depend upon a moving part of the machine to perform this function. It cannot be performed by the stationary cam O. Accordingly, I pivot to the cam O a bridging cam 137 which will lie in the path of travel of the roller 131 of the clamping arm. The bridging cam comes into play at the time each block is brought to rest in the first position of the machine. At that time it extends outward in order to hold the clamping arm P elevated. It is held outward in this way by a moving cam 138 keyed to the upper end of the shaft B and shaped so as to come into play to allow cam 137 to recede only when the time has arrived for the clamping arm P to drop into blank engaging position. Thus the stationary cam O, supplemented by the bridging cam 137, causes the clamping arms P to perform all the requisite functions.

The cam M on the main shaft B cooperates with levers and links to operate the feeder E, the cutter F, the folding mechanism G, and the end folding devices H. Cam N cooperates with those parts which come into play at the fourth position to fold the flaps and eject the lined carton into the conveyor. These various operations will be best understood when describing the feeder, cutter, and mechanisms G, H and J at the different operating positions of the machine.

Referring now to the feeder E, it will be noted that the same is positioned at the outer edge of the extension top 45 in line with the blank wrapping mechanism G at the first position of the machine. The frame of the feeder includes two tracks 139 which are secured at their forward ends to the ends of a transverse die member 140 of the cutter F. This member has rearward extensions 141 to which these tracks are secured, preferably by screws 142 (Figs. 24 and 25). It is positioned on an inclined face 143 on the top of the table 45 near its outer edge. Between the tracks 139 at their outer end is a roller 144; a rod 145 connects the tracks 139 adjacent to the roller 144 and firmly holds them in position. A plate 146 is secured at one end to the rod 145, and at the other end to a transverse member 147 adjacent to the die member 140 of the cutter. The member 147 rests at its ends upon the tracks 139 and is secured thereto by any suitable means. The plate 146 at its forward edge is just flush with the upper surface of the die 140 so as to prevent the forward edge of the web catching as it passes from the plate over the die. Longitudinal slots 148 are provided in the plate 146 and gripping fingers 149, 150 travel to and fro in them. Brackets 151 extend downward and outward from the edge of the extension top 45 and at their lower ends are provided with pins 152 by which the roll 153 of parchment paper or other like material is held. Ordinarily these rolls come with openings in the ends which are closed by wooden plugs. These are removed and metal collars driven in to take their place. These collars fit the pins 152. From the under side of the roll 153 the web of paper 154 passes over the pendant roller 155, which is supported by arms 156 hung from the outer ends of the tracks 139. The web continues over the roller 144 and the plate 146 toward the cutter F and folding mechanism G. By means of the roller 155 a suitable tension is maintained on the web 154. The latter, after leaving roller 144, passes between the gripping fingers 149, 150. These fingers are mounted on transverse rods 157, 158 which extend between ends 159 which are provided with tongues which fit into the grooves of the tracks 139. The frame 160 thus provided by the rods 157, 158, and ends 159, is movable to and fro along the tracks 139. Adjustable stops 161 are secured to the tracks 139 at any desired position, depending upon the feed that is to be given the paper on each stroke. These stops limit the backward movement of the frame 160. The latter is actuated by a set of rods, links, and levers. These include rods 162 which are connected at their outer ends to the transverse rod 158 of the frame 160, and at their inner ends to the upper ends of crank arms 163. Suitable openings 163' in the die member 140 permit the rods 162 to freely pass therethrough. Likewise slots 216 in the extension top 45 allow for the passage of the arms 163 and their oscillations. The crank arms 163 are keyed at their lower ends to a transverse shaft 164 journaled in the upright frame 47. A short crank arm 165 on the under side of the boss of one of the arms 163 is connected by a link 166 with the short arm of the bell crank lever 167, likewise pivoted in the upright frame member 47. The inner end of this lever 167 is provided with a cam roller 168 which bears against the middle cam track on the under side of the cam member M, as clearly illustrated in Fig. 3. In addition to the gripping fingers 149, I also employ a set of similar fingers 169 mounted on a transverse rod 170 and cooperating with the plate 147 in the same way that the fingers 149 cooperate with the fingers 150. The rod 170 is supported at its end by uprights 170' which are mounted at the forward ends of the tracks 139. I provide for the proper movement of the gripping fingers 149 and 169 by a frictional connection between these members. Preferably such a connection is provided at each side of the feeder adjacent to the tracks 139. These connections are illustrated more particularly in Figs. 23 and 32. The rods 157 and 170 which carry the gripping fingers 149 and 169, respectively, are provided with cranks 171 and 172. The outer end of the crank arm 172 in each case is connected to the forward end of a rod 173. In each instance the rod extends through a friction device 174 at the outer end of the crank 171. This device, shown more particularly in Fig. 32, is the same as the friction device 175 associated with the carton ejecting mechanism, shown more particularly in Fig. 22. It includes, besides the rod 173 which passes through a hole in the stem 176, a pair of washers 177 which are pressed by the spring 178 into frictional engagement with the rod. A knurled nut 178' is threaded on the end of the stem 176 and may be used to adjust the compression of the spring 178. Considering more particularly Fig. 32, it will be seen that as the grippers 149, 150 are moved forward to feed the web they will press against the opposite sides of the web but the drag on the rod 173, caused by the friction device 174, will rock the crank 172 counterclockwise and thereby raise the gripping fingers 169. Upon the reverse or backward movement of the gripping fingers 149, 150, said fingers will open so as to freely slip over the web, while the drag on the rod 173 by the friction device 174 will cause the fingers 169 to press down upon the web to clamp it against the plate 147 to hold the web against backward movement. Not only do the friction devices produce the effect of raising the fingers 169 upon the forward movement and lowering them upon the reverse movement, but their presence causes the fingers 149 and 150 to more firmly grip the web on the forward movement and fully release it upon a backward movement. The cam M has its intermediate cam track on the under side so shaped that there will be one complete reciprocation of the grippers 149, 150 for each revolution of the shaft B. When the feeder is in full operation the stroke will be equal to the length of the blank which is to be cut off from the forward end of the web. The feeder will carry the forward end of the web to the proper point over the folding mechanism G in the first position of the machine. It may be noted that the cam track which operates the feeder is so shaped as to bring about an advance of the web at a time when the forming blocks are in motion. In this way the arrival of a block at the first position will find there a blank ready to be folded and there need be no delay in the folding operation. The cam M is kept in operative engagement with its cam roller by spring action. For this purpose the pivot pin 179 upon which the bell crank 167 is mounted has a torsion spring 180 coiled about it and secured at one end to the crank arm 167, and at the other end to a nut 181 secured to a pin 179 after the manner of the connection between the clamping arms P and their supporting pins 128, shown particularly in Fig. 4, and heretofore described. The spring 180 is tightened up by means of the nut 181 so as to exert a strong pull upon the parts, which pull tends to force the cam roller 168 against the track of the cam M. The action of the spring 180 is supplemented by that of a long coiled spring 182. One end of the spring 182 is connected to one of the crank arms 163 a short distance above its pivot while the other end is connected to a fixed part of the machine, such as the bolt 183 adjacent to the paper roll bracket 151. Obviously the pull of both springs tends to return the reciprocating frame 160 of the feeder E back to its limiting position against the stops 161.

The cutter F is employed to sever the blank from the end of the web which has been advanced by the feeder. No further advance of the blank is made after the cutter has operated. All feeding of the web to the proper point above the mechanism G is obtained before the cutter is actuated. In order that the parts of the cutter may not interfere with the blank as it is being folded about the forming block, the cutter is set so as to reciprocate in a plane a few degrees from vertical. The end of the blank is moved vertically while the path of the cutter head is in a plane a few degrees from the vertical. Ordinarily, a difference of 5° is sufficient to prevent the interference. Consequently the cutter die member 140 is set on an inclined face 143, as previously mentioned. This gives the proper divergence, the plane through which the cutter travels being normal to the plane of this face. The die member 140 is preferably a casting shaped with the rearwardly extending projections 141 at its ends, as previously noted, and provided also with a number of vertical webs 184 and horizontal webs 185 which gives the member a sort of cellular formation. The idea is to give rigidity and strength without unduly increasing the weight. The die member 140 has a transverse kerf 186 and a number of longitudinal kerfs 187 which join the transverse kerf as clearly shown. The cutter head 188 is provided with a tranverse knife, or series of knives, 189, and longitudinal knives 190 which abut at their ends against the transverse knife 189. These knives are arranged and spaced the same as the kerfs 186 and 187. The blank which is cut from the end of the web is one having a slitted forward end, the material between the slits constituting flaps which are to be used in the closing of the container after it has been filled with its commodity. This is true whether the machine be made to manufacture a substantial container or merely a liner for a carton. The tranverse knife 189 cooperates with the transverse kerf 186 to cut off the blank from the web. The longitudinal knives 190 cooperate with the longitudinal kerfs 187 to slit the end of the web on the feeder side to form the proper cuts for the next blank. The cutter head 188 is connected at its ends to heavy rods 191 which pass through holes in the member 140 and the table top 45, being connected at their lower ends by a yoke 192. Preferably the rods 191 have shoulders 193 against which the lower edge of the head 188 rests and the latter is firmly secured to the rods by nuts 194 screwed on to the upper threaded ends of the rods. At the lower ends of the rods connection is made by passing the rod through holes in the ends of the yoke 192 and employing nuts 195 and 196 on the threaded ends of the rods to firmly secure the yoke and rods together. To insure an accurate movement in the cutter plane the rods 191 are given a long bearing in the die member 140. This is preferably accomplished by an extension 197 associated with each rod. Each rod 191 is surrounded by a coiled compression spring 198. One end of the spring in each instance bears against the end of the projection 170 at one end, and at the other against nut 195 on the rod. Since the projections 197 are part of the fixed structure of the machine, the tendency of the springs 198 is to force the yoke 192 and rods 191 downward to bring the head 188 into cutting position. This tendency of the springs 198 is resisted by the connections with the cam M. These include a cam lever 199 which is pivoted at an intermediate point to the frame member 47. The lever 199 is connected at its outer end with the yoke 192 by an adjustable link 200. The other end of the cam lever 199 is provided with a cam roller 201 which rides on the innermost track on the under side of the cam M. Obviously this cam track is shaped so as to force the cam roller 201 downward at all times during the rotation of the cam M, except when the exact time comes for dropping the cutter blades; at that instant the cam roller 201 should meet an abrupt end to the cam which would allow it to fly upward as a result of the action of the springs 198 which thereby cause the cutter head 188 to descend. The return movement of the cutter head must be accomplished by the cam track again pressing gradually downward upon the cam roller 201 until the parts are restored to the elevated position.

At the time the web of material is cut, the same should be clamped firmly against the die member 140. To this end I employ a clamping member 202 which extends practically throughout the length of the die member 140. Preferably this clamping member 202 has openings at its ends which engage the rods 191 which serve to guide it in its up and down movements. The edge of the member 202 closely approaches the transverse kerf 186 and is cut away for the passage of the longitudinal knives 190 into the longitudinal kerfs 187, as shown more particularly in Fig. 1. The clamping member 202 is secured near its ends to vertical rods 203 which pass loosely through the cutter head 188 and through openings in the upper web 185 of the die member 140. On each of the rods is a coiled compression spring 204 which acts between the under side of the web 185 and the upper side of a nut 205 secured to the lower end of the rod. Each rod is also provided with a head or nut 206 at its upper end which prevents its passing through the head 188. When the parts are in normal position the clamping member 202 is a short distance, in the neighborhood of a quarter of an inch, from the upper face of the die member 140. As soon as the head 188 begins to move downward the springs 204 act to pull the rods 203 downward also. This movement causes the clamping member 202 to engage the upper side of the web to clamp it against the die member 140. Further downward movement of the head 188 has no effect upon the rods 203 which slip freely through the head. Upon the return movement of the cutter head the nuts 206 are engaged by the head and the clamping member 202 raised to its elevated position, the springs 204 being placed meanwhile under compression. For the purpose of keeping the forward edge of the web from being caught by reason of the kerf 186, I employ a series of springs 207 which are secured at their rear ends to the upper side of the die member 140 in recesses 208 formed therein. The recesses 208 are made the same size and shape as the springs 207. With this arrangement the rear ends of the springs do not extend above the surface of the member 140, and as they are pressed down by the clamping member 202 coming into clamping position, each spring merely takes its place in its recess. The springs are biased so as to normally press their forward free ends slightly against the under surface of the clamping member 202 in the manner illustrated in Fig. 28. The knives 189 and 190 on the cutter head 188 may be variously mounted. As shown in Fig. 26, the cutter 189 is secured to the head 188 by screws 209. The longitudinal cutters 190 are mounted each on a rod 210 threaded at its upper end and provided there with a thumb nut 211. Obviously other ways of connecting the cutter blades to the head may be employed. As the web is cut so as to provide the blank, I preferably employ a guide 212 at each side of the web so as to engage its edge and prevent it from turning upward. The guide 212 is angular in form and the horizontal web will engage the upper side of the blank to prevent its up-turning. The guide 212 is mounted in each instance upon a curved support 213 which is secured at its lower end to the die member 140 by any suitable means, such as one or more screws 214. The member 212 also serves to keep the web traveling in the right path as it is forwarded. The guide 212 is connected to the support 213 by thumb screws 215 which pass through slots in one member into threaded engagement with openings in the other. These guides direct the forward end into the proper position above the parts of the folding mechanism G.

Having a blank delivered at the first position, it only remains for one of the forming blocks D to present itself over the parts of the mechanism; then the wrapping operation begins. The first element of the mechanism G to operate is the clamping plate 218 which, when the block D is properly centered, lies directly below it and extends a short distance beyond its outer end, as clearly shown in Fig. 7. As the member 218 moves upward, it carries the blank with it up into engagement with the under side of the forming block D. The next parts to move are the angle plate 219 and its auxiliary plate 221. These plates are moved into the dotted line position of Fig. 6 and carry with them the adjacent portion of the blank, folding it over one side and the top of the block. Following this, the other angle plate 220 and its auxiliary plate 222 move upward, passing through and beyond the dotted line position of Fig. 6, carrying with them the adjacent portion of the blank and finally folding it over the side and top of the block into the position shown in Fig. 14. The auxiliary plates 221 and 222 are yieldingly mounted and are capable of movement relative to their main plates 219 and 220, respectively, from the full line positions of Fig. 6 into engagement with the main webs of the angle plates 219 and 220, the limiting position of auxiliary plate 221 being indicated by the dotted line position of the parts in Fig. 6. By these auxiliary plates the blank is folded against the sides before the members 219 and 220 have an opportunity to turn the blank to form the top. As clearly shown, the angle plate 219 and its auxiliary plate 221 are pivotally mounted on the same axis. Likewise the angle plate 220 and its auxiliary plate 222 have a common axis. In each instance a pivot pin 223 is mounted in brackets 223' near the upper edge of a support 224 which rises from the extension top 45 at a point beneath the clamping plate 218. A coiled spring 225 serves in each case to give the yielding action required by the auxiliary plate. The spring is coiled about the pivot pin 223 and is secured at one end to one of the hinge members 226 of the auxiliary plate, and at the other end to a nut 227 secured to the pivot pin 223 by a transverse pin 228, the pivot pin 223 being secured in turn to the hinge member 229 of the main plate by a pin 229'. This structure is clearly shown in Fig. 7, where one of the hinge members 226 of the auxiliary plate 222 and one of the hinge members 229 of the main plate 234 are shown. A stop arm 226' on the under side of the hinge member 226 limits the separating movement of the plates. This is the construction at one end of the pin 223. Preferably, the same construction, reversely arranged, is provided at the other end of the pivot pin 223. It will be understood also that the same mounting is provided for the plates 219 and 221, as for the plates 220 and 222. As clearly shown in Fig. 7, the outer leaves 233 and 234 of the angle plates 219 and 220, respectively are cut away to provide a series of tongues with open spaces between them. This is done for the purpose of providing points upon the folded blank where the rollers 136 on the head 135 of the clamping arm P may find engagement. As previously pointed out, as soon as the blank is wrapped around the forming block so as to give the tubular arrangement of Fig. 14, the clamping arm P has its bridging cam 137 moved out of the way so as to allow it to drop into clamping position on the block D. This occurs before the angle plates 219 and 220 are removed from that position in which they tightly hold the blank folded upon the block. As soon as the blank in this form is clamped by the arm P, the member 219 is restored to normal position followed closely by the restoration of member 220 and finally the clamping plate 218 is lowered. When these elements have been restored to normal, the Geneva movement mechanism L moves the turret C and thereby carries the particular forming block in question from the first position of the machine to the second.

In bringing about these operations of the members 218, 219, and 220, cam tracks on the upper side of the cam M are employed, in conjunction with suitable cam levers and connections. The central clamping plate 218 has a boss on its under side into which is threaded a rod 235. This rod is guided in its movements through an opening 236 in a thickened portion of the extension top 45. At its lower end the rod 235 is connected to the short arm of a lever 237 which is pivoted to the upright 47. The inner end of the lever 237 carries a cam roller 238 which runs upon the innermost cam track on the upper side of the cam M. As clearly shown in Fig. 5, this track is shaped so as to hold the plate 218 in its clamping position during practically a half revolution of the shaft B. In this instance, the long heavy arm of the lever 237 tends to hold the cam roller 238 in contact with the cam track but I also preferably augment this tendency and thus insure operative contact between the roller and the track at all times by employing a coiled compression spring 235' surrounding the rod 235 just beneath the plate 218 and acting between the under side of said plate and the upper face of the adjacent portion of the extension top 45 on which the support 224 is located. The angle plate 219 is connected not far from its pivot pin 223 to the upper end of a rod 239 which is in turn connected at its lower end to the outer end of a cam lever 240. In this instance the short arm of the lever 240 is provided with a cam roller 241 which travels on the outermost cam track on the upper side of the cam M. The angle plate 220 is likewise connected to the upper end of a rod 242 which in turn is connected at its lower end to the outer end of a cam lever 243 which is provided at the end of its short arm with a cam roller 244 which bears upon the same track as the roller 241. With both rollers traveling on the same track it will be seen that the angle plates will be operated in succession, just as heretofore explained. In this instance also, the plates 219 and 220 remain in block embracing position during more than half a revolution of the shaft B. In this instance the cam levers 240 and 243 are provided with torsion springs 245 and 246 which cooperate with nuts 247 and 248, respectively, to supply the necessary retractile force to maintain the cam rollers upon the same track at all times. The arrangements of springs and nuts in this instance are the same as that illustrated in Figs. 4 and 31. By means of the screw connections at the tops of the rods 235, 239, and 242, it is possible to obtain sufficiently nice adjustments for the operation of the plates 218, 219, and 220, respectively.

Having the blank wrapped around it and its overlapping edges clamped by the clamping arm P, the forming block in question moves, as we have stated, to the second position of the machine. It is here that the end of the blank is folded up to form the bottom of the container or liner. When the block reaches the second position, the blank then is in the form illustrated in Fig. 14 with the clamping member P holding it in that form. The first operation on the end of the blank is to make the fold illustrated in Fig. 15. This is done by thrusting the lower end plate 249 upward against the blank so as to finally press a portion of it firmly against the end of the block D. Before this movement of the plate 249 takes place, however, two blades 250 are moved upward and outward along opposite sides of the block D, pressing as they do so against the adjacent walls of the partially formed container. These blades are moved into the position illustrated in Fig. 10. When the blades 250 are in this position then the end plate 249 is moved upward as just explained. When the plate 249 reaches its final upward position against the end of the block, two wings 251 pivotally mount to rotate about axes near the end of the plate are moved outwardly. These wings 251 engage the portions 252 of the partially formed blank of Fig. 15 and force them outward. This has the effect of pulling down the portion 253 of the blank, as shown in Fig. 15, about the edge 254 of the block. In this way the end of the blank is folded into approximately the position illustrated in Fig. 16. The next operation is to withdraw the lower end plate 249 and bring the upper winged plate 255 down against the loosely fromed bottom of the container to turn the folding portions 256, as viewed in Fig. 16, back against the sides of the container into approximately the position illustrated in Fig. 17. In the case of the upper winged plate 255, a spring pressed auxiliary plate 257 is employed somewhat like the auxiliary plates 221 and 222 of the wrapping mechanism G. In operation, the plate 257 first catches the blank so as to press it firmly against the end of the block, and immediately following this the wings 258 upon the member 255 press against the portions 256 to bring them into the final position of Fig. 17, as just explained. When these operations have taken place, the lower end plate 249 having been withdrawn before the downward movement of the upper end plate 255, it only remains for plate 255 and blades 250 to return to their normal position. When this takes place the Geneva movement mechanism L again shifts the block in question to the third position of the machine. During all this time the clamping member P has firmly held the blank upon the block. This it continues to do, as previously pointed out, until after the third position of the machine has been passed.

It will be noted that during these several operations, including those at the first position, the blank, designated generally 259, has its flaps 260 and 261 extending inwardly upon the block D. These flaps are the result of the slits cut by the longitudinal cutters 190 of the cutter F, previously described.

As previously noted, the various parts of the end forming mechanism H are mounted in a frame 50. This frame has low side walls 262 provided on opposite sides with bosses 263 which are bored out to accommodate pivot pins 264 for the mountings of the blades 250. Each pin 264 is secured in the boss 263 in any suitable way, as by means of a transverse pin 264'. In each instance the blade 250 is secured to a short arm 265 on a sleeve 266 which is adapted to fit over the pivot pin 264. A cotter pin 266' through the inner end of the pin 264 keeps the sleeve 266 from slipping off the pin. The sleeve 266 is provided with a crank arm 267. Normally these parts occupy the position shown in Fig. 8. In such position the blade 250 and the crank arm 267 lie below the path of travel of the block D. As shown more particularly in Fig. 12, the pivot pins 264 extend toward the block and terminate in vertical planes adjacent to its sides. In this way the supports for the blades 250 do not obstruct in any way the movement of the lower end plate 249. The cranks 257 are connected at their outer ends to the upper ends of rods 268 which are united by a yoke 269, which in turn is connected at a central point to a cam lever 270 which carries a cam wheel 271 at its inner end. The lever 270 is suitably pivoted in the standard 48 and is held in retracted position by a tension spring 272 connected at one end to a lever 270 distant from its pivot, and at the other end to a point on the standard 48. The cam roller 271 travels on the outermost cam track on the under side of the cam M. This track is shaped so as to raise the blades 250 at the beginning of the end forming operations and to maintain them in that position until all such operations have been concluded and to thereupon allow them to return to normal position under the retracting influence of the spring 272.

The end plate 249 is supported at its lower edge upon two connected crank arms 273 which are provided at their inner ends with bosses 274 which are bored out for the passage of transverse pins 275 which project through bosses 276 in the side walls 262 of the frame 50. One pin 275 is secured to its fixed boss 276 by a transverse pin 277, and the arm 273 thereon is free to rotate. The other pin 275 is free to rotate in its fixed boss 276 and is pinned to its arm 273 by a pin 277' and at its outer end has fixed to it, by a pin 279, a crank arm 280 which is connected at its outer end to the upper end of a rod 281. The latter in turn is connected at its lower end to the outer end of a cam lever 282 suitably pivoted in the standard 48. The inner arm of the lever 282 carries a cam roller 283 which bears upon the second cam track from the outside on the upper side of the cam member M. This cam track is shaped so as to give the requisite movement to the end folding member 249 in proper timed relation to the other operations, all as previously explained. The cam roller 283 is kept in contact with its cam track through the agency of a torsion spring 284 which acts between the lever 282 and a nut 285 on the end of the pivot pin upon which the lever 282 is mounted. The arrangement is the same as that previously described in connection with the clamping arms P and their mounting, as shown more particularly in Fig. 4.

As previously pointed out, the upper folding movement of the end plate 249 is immediately followed by the spreading of the wings 251. These wings, as clearly shown, are supported on upright pins 286 which pass into openings in the bosses 287 and 288 located at the outer ends of the arms 273 on which the end plate 248 is carried. The pins 286 pass freely through the openings in these bosses but at a point intermediate of the same are secured to the bosses of crank arms 289 which extend toward each other in the neighborhood of the lower edge of the plate 249. It may be pointed out, too, that the outer ends of the arms 273, which carry the bosses 287 and 288, are united by transverse bars 290, 291, which are preferably integral with the arms 273. These cross bars with the arms 273 thus provide a rigid U-shaped frame mounted on the pivots 275; consequently power applied to the crank arm 280 at one side only is properly transmitted from one arm 273 to the other without in any way distorting the structure. The crank arms 289 of the wing structure are movable to and fro in the space between the members 290 and 291. The outer ends of the crank arms 289 are connected to the outer ends of rods 292 which are connected at their rear end to the long arm of a lever 293. The latter is pivoted to the lower end of the bracket 49. The spring 294, acting between the lever 293 and the bracket 49, tends to hold the parts in retracted position, that is to say, the position illustrated in Fig. 13. The lower end of the lever 293 is connected by a link 295 to one arm of a bell crank lever 296 journaled on the same pivot pin as the lever 282. The inner end of the bell crank lever 296 is provided with a cam roller 297 which engages the second cam track from the center of the cam M on the upper side of the same. This cam track is shaped so as to cause the wings 251 to force the partially formed container end in the manner previously described to bring about the fold 254 of Fig. 15. It also during the same revolution of the cam causes the wings to restore to normal after being withdrawn from the partially formed end of the container after the same has been brought into the position illustrated in Fig. 16.

The mounting for the upper winged plate 255 and the associated auxiliary plate 257 is provided by the side walls 298 of the frame 50. A rod or shaft 299 is journaled in bearings formed in the side walls 298 and extends beyond one of these walls far enough to receive a crank arm 300, which is suitably fixed to the end of the shaft by a pin 301 or other means. The member 255 is provided with a supporting arm 301' which is threaded upon the shaft 299 and fixed to it by any suitable means, such as the set screw 302. The auxiliary member 257 is provided with a similar supporting arm 303 which is also threaded upon the shaft 299 but, instead of being fixed thereto, is free to rotate thereon under the influence of a torsion spring 304 which has one end fastened to the bearing in the side wall 298, and the other end fastened to the boss of the supporting arm 303. The spring 304 tends to force the members 255 and 257 apart and their separation is limited to that shown in Fig. 8, for example. This limit is determined by suitable stops preferably provided by the adjacent surfaces 305 and 306 on the members 255 and 257 respectively. The action of these members has been explained before. The auxiliary member 257 comes into play upon the blank and serves to fold it against the end of the block before the member 257, carrying the side wings 258, can bring those wings into engagement with the blank. The crank 300 is also operated from the cam M through a system of links and levers. These include a link 307 which unites the outer end of crank 300 to the long arm of a bell crank lever 308 pivoted upon a projection 309 from the upper part of the frame 50. The other arm of the bell crank lever 308 is connected to the upper end of a rod 310, and the latter is connected at its lower end to the outer end of the long arm of a cam lever 311, pivoted upon the standard 48 upon the same pivot, designated 314, as the lever 282. The inner end of the lever 311 is provided with a cam roller 312 which bears upon the same cam track as the roller 283 of lever 282. The same cam track is capable of applying the requisite movements to both of these levers. The cam roller 312 is kept in contact with its track through the agency of a long coiled spring which is connected to the outer end of the lever 311 at one end and to a fixed arm 313 on the frame 50 at its other end. The lever 311 is also assisted in maintaining its cam roller 312 on its cam track by a torsion spring 315 fixed at one end to the lever 311 and at the other end to the nut 316, fixed to the pivot pin 314, all as more clearly illustrated in Fig. 31.

The several cam tracks on the cam M which are brought into play for the levers which control the mechanism H at the second position of the machine, not only bring about the several folding operations previously enumerated and explained, but restore the several parts to normal after the fold of Fig. 16 has been made, so as to allow the block with the container thus formed thereon to advance to the next position of the machine.

From what has been said it will be seen that the particlar forming block in question leaves the second position of the machine with the lining container upon it folded into the form illustrated in Fig. 17, the associated clamping arm P meanwhile holding the formed container upon the block as it travels to the third position. When such position is reached, the attendant takes a carton and slips the same over the container 259 thus formed on the block. In doing so, the carton wall can be readily slipped under the rollers 136 of the head 135 of the clamping arm P which holds the shaped container on the block. With a little practice the attendant becomes very skilful in this work, which, obviously, is his, or her, principal work. However, such person will have constant supervision of the machine and by reason of the nearness of the hand lever 72 may stop it quickly, in case that becomes necessary. The carton with the liner in it, and the matched flaps of both liner and carton extending inward along the block, then passes by reason of the action of the Geneva movement mechanism L to the fourth and final position of the machine. As the block moves from the third position to the fourth, the stationary cam O acts on the associated clamping arm P to raise it out of clamping engagement with the block.

The mechanism J at the fourth position first operates through the flap turning blades 118, 119 to turn back the flaps of both carton and liner upon the outer walls of the carton and then to withdraw the lined carton from the block and drop it into the conveyor K. These functions are brought about by the to and fro movements of the member 55 upon the tracks 53, 54 extending outward from the frame A at this position of the machine. The member 55 upon its inward movement presses against the outer end of the block D and forces it longitudinally toward the center of turret or head C. The coiled spring 115 within the shell 108 of the block permits this receding movement of the block. As the block moves in this direction the inclined surfaces at the forward ends of the blades 118, 119, slip out of the openings 124, or 125 as the case may be, and advance against the flaps upon the liner and carton and force them back against the sides of the latter in the manner clearly illustrated in Fig. 18. During this movement the ejecting fingers 317 are moved upward out of engagement with the block D. As the member 55 is pressed home against the end of the block, the clamping wings 318 upon the head engage the sides of the carton. Upon the return or outward movement of the head 55, the fingers 317 drop into engagement with the block and the wings 318 firmly clamp the carton and the combined action of the fingers and wings withdraws the lined carton from the block. As the parts are shown in Fig. 18, this outward movement is just about to begin. After the member 55 has moved far enough for the stops 319 to engage the arms 320 of the wings 318, the clamping wings are moved out of engagement with the carton and the latter is allowed to fall, being guided as it does so by a bail 321 carried with the head 55, and the guiding surface 322 which leads to the conveyor K. These parts serve to right the carton so as to present it open end up upon the belt 85 of the conveyor.

The member 55 is best illustrated in Fig. 22. It comprises ends 323 having tongues 324 which fit in the grooves in the guide ways 43, 44. As previously noted, the yoke 57 serves to reciprocate the member 55. The connection between these parts is shown more particularly in Fig. 18, where each end of the yoke 57 is connected by an adjustable link 325 to an apertured lug 326 on the inner side of the member 55. The bail 321 extends across the space spanned by the yoke and is secured at its ends to the ends of adjustable arms 327 movable along links 325, and being adapted for adjustment in each case by a set screw 328. The outward movement of the member 55 brings the bail 321 into the right position to engage the side of the carton as it is freed by the clamps 318. In this way the carton is delivered right side up, as previously noted. The yoke is actuated by cam N through the agency of a reciprocating member 329 and a link 330 which connects the member 329 with the yoke 57. The member 329 is bifurcated so as to straddle the main shaft B. Near one end it carries the cam roller 331 which travels in the groove or cam track 332 of the cam N, which is shown in plan in Fig. 30. The cam track 332 is circular through about half of its extent, and through the balance of its extent is provided with a double reverse curve. As a result the head 55 remains at its outer position inactive during about a half revolution of the shaft B, and then during the other half revolution makes its inward excursion and returns to its outer position again.

The wings 318 on the reciprocating member 55 are provided with vertical pivots 333 which are journaled in suitable bearings in said member. In the case of each wing 318 I employ a coiled spring 334 which acts between a fixed point on the member 55 and the wing to normally press the wing inward. Thus the wings are normally pressed toward each other and rest against stops. The distance between them is slightly less than the corresponding dimension of the carton, and consequently the outer ends of the wings are flared so as to enable the carton to be readily engaged, as the member 55 moves forward toward the block D. As previously noted, each wing 318 is provided with an arm 320 which is moved outward from the member 55 by the action of the associated spring 334. When the member 55 has just about reached the limit of its outward movement these arms 320 engage the stops 319, and as a result the wings 318 are moved outward against the tension of the springs and the carton is freed for delivery to the conveyor K. The outer ends of the guide ways 53, 54 are connected by a transverse frame 335 is rigidly held in place and carries the stops 319 previously mentioned. These are preferably adjustable by having them threaded through threaded openings in the member 335 and secured in place by lock nuts 336. The member 335 also serves as a support for an upright 337 which is offset so as to provide a support for rod 338 of the friction device 175 mentioned heretofore when describing the friction device of the feeder E. The rod 338 is secured to the upright 337 in any suitable way as by means of the nuts 339 upon the threaded end of the rod. The free end of the rod 338 passes through the stem 340 of the friction device 175. The latter, as in the case of the other friction devices, comprises two washers 341 which are pressed into engagement with the rod by means of a spring 342. A head 343 is threaded on to the end of the stem 340 so as to vary the pressure of the spring 342, and hence the extent of the friction applied. This friction device is for the purpose of operating the fingers 317. The latter are secured at their pivoted ends to a pivotal support 344, the pivot of the same extending through apertured bosses 345 upon the upper portion of the reciprocating member 55. The pivotal support 344 has an arm 346 extending upward from it and the stem 340 of the friction device extends into and is secured to the upper end of this arm 346. As a result of this construction, it will be seen that when the reciprocating member moves outward along the guide ways 53, 54, there will be a drag exerted which will tend to move the arm 346 counter-clockwise, as the parts are viewed in Fig. 18, and thus force the fingers 317 downward against the top of the block D. This position of the fingers against the block continued throughout the outward or discharging movement of the member 55. The ends of the fingers 317 are turned downward and firmly press against the block so that if there is no tendency on the part of the liner to slip out of the carton by reason of adherence to the block, these fingers will engage the same and positively remove the liner from the block. Because of the position of these fingers, this will occur without the liner being dislodged from the carton. When the member 55 has reached the limit of its outward movement, the friction device 175 will operate in a like manner to raise the fingers 317. They will thus present themselves in a raised position at the time the flap engaging blades 118, 119 are performing their function and will not move into engaging position on the block until after these blades have done their work and it is time for the finished product to be discharged from the machine. The effect of this outward drag upon the crank arm 346, by which the fingers 317 are elevated as the member 55 moves inward, is limited by a stop arm 347 on the pivotal support 344, engaging a rib 348 on the rear side of the member 55, as clearly illustrated in Fig. 22. As previously noted, during all these periods at the fourth position of the machine, the clamping arm P remains in elevated position. The guide 322 of the conveyor K is suitably supported upon a bracket arm 349 attached at its upper end to the frame member 41 and extending downward to a position near the top of the conveyor belt 85. As clearly shown, the lower ends of both the bracket 349 and the guide 322 are vertical. Cooperating with this vertical portion of the guide 322 is a similar guide 350 supported in turn upon a bracket 351 rising from the bearing 87 in which the shaft 83 of the conveyor is journaled.

By following around one of the forming blocks during its several quiescent positions, we have been able to follow the course of a blank from the time it was received as such through the several steps of the mechanism until a lined carton is discharged from the machine and conducted away upon the belt of the conveyor. It will be obvious, however, that the four forming blocks are simultaneously being worked upon in the different positions of the machine. As a result four containers or lined cartons are formed for each revolution of the head C. This means that there have been four revolutions of the machine shaft B. Part of each revolution is taken up by shifting the blocks one step, and the balance of the revolution has been employed in actuating the mechanisms in the different positions.

In setting forth the various parts of the machine various terms have been used but these are to be understood in a generic or descriptive sense rather than as words of limitation. The same is true of the different words used in the claims to describe the same parts. No especial effort has been made in defining the parts to use the same words in both the description and claims but it is believed the invention is clearly set forth in both.

It should be noted that the flap fixing blades 118 and 119 normally rest in recesses 118' and 119' respectively in the shell 108 of the block D. This position of the blades prevents their interfering with the formation of the container thereon and thus keeps the latter as well as the block rectangular in cross section with smooth blank engaging surfaces.

It will be apparent that in carrying out my invention many alterations and modifications may be made in the specific structures herein disclosed. I therefore do not wish to be limited to the exact details of the disclosure, but aim to cover by the terms of the claims all such alterations and modifications as lawfully come within the spirit and scope of my invention.

What I claim as new and desire to secure by Letters Patent of the United States is:

1. A machine of the class described comprising a forming block, members operable from beneath a blank to fold it up and around said block, a feed table before said members in position to deliver a blank above said members, means for advancing the forward end of a web of paper a distance equal to the length of a blank, and a cutter between said advancing means and said folding members to cut off the web to complete a blank thereby left on said folding members and to cut slits in the forward end of the web which again will be cut off after the next step to form the next blank.

2. A machine of the class described comprising a forming block, members operable from beneath a blank to fold it up and around said block, a feed table before said members in position to deliver a blank above said members, means for advancing the forward end of a web of paper a distance equal to the length of a blank, a cutter between said advancing means and said folding members to cut off the web to complete a blank thereby left on said folding members and to cut slits in the forward end of the web which again will be cut off after the next step to form the next blank, and edge and side guides for the advancing web for engaging its forward end after it passes the cutter and begins to pass over said folding members.

3. In a machine of the class described, a forming block under which a blank may be located, a plate beneath said block operative to press said blank upward against said block, a pair of side and top forming members each having an angle plate for fitting against the side and top of said block, said angle plates being pivoted at their adjacent edges, auxiliary spring pressed plates pivoted on the same axes and operative to engage said blank before said angle plates in the folding operation, and means for rocking said angle plates in blank folding direction one slightly in advance of the other.

4. In a machine of the class described, a forming block, an angular plate pivoted along one edge on an axis parallel to the lower edge of said block and close to the plane of one side of said block, the width of the adjacent web of said plate reaching to the top edge of said block when said plate is rotated about its axis into engagement with said block and the outer web of said plate being positioned at an angle so as to extend along the upper face of said block when said plate is so rotated, an auxiliary plate pivoted on the same axis as said angular plate and adapted to be pressed against the adjacent web of said angular plate when said parts are rotated into engagement with said block, and means for yieldingly holding said auxiliary plate away from said adjacent web when said parts are in open position whereby said auxiliary plate first engages the blank as the parts are being moved to closed block-engaging position.

5. A machine of the class described comprising a forming block and a clamping member cooperating therewith to hold a blank wrapped about said block, said member engaging overlapped edges of the blank on the top of said block, a pair of blades movable to positions against the sides of the blank at the end of said block upon which the end folds are to be made, an end plate movable from beneath upward and inward toward the end of said block to bring the lower portion of the blank firmly against said end, wings on said end plate movable outward after said fold has been made by said end plate to force the side portions of the blank outward and thereby draw the upper portion downward to start its downward fold, an upper winged plate movable downward and inward against the folded end of the blank but only after said end plate has been removed therefrom, means for withdrawing said winged plate and said blades, and means for continuing the action of said clamping member to hold said overlapping edges together and the blank on said block during all these end folding operations.

6. A machine of the class described comprising a forming block, means for moving it into four successive positions, means at the first position operable through a cycle to receive a blank and wrap it about said block in tubular form with overlapping edges on its upper side, means at the second position operable through a cycle to fold up the blank at the end of said block to form the end of the container, a member for engaging said overlapping edges and clamping them to said block immediately after said edges have been overlapped and continuing such clamping action from that time on until the third position is passed, a carton being slipped over the end of the container on said block at the third position, and means at the fourth position for bending back the flaps of the carton and lining container and then ejecting the lined carton from the machine.

7. In a machine of the class described, a forming block on which a blank is held wrapped about the block in the form of a tube, a pair of blades rotatable about an axis from a position below said block into engagement with the sides of the blank at the outer end of said block, a lower end plate movable from beneath upward and inward toward the end of said block to bring the lower end portion of the blank against said block end, wings on said end plate subsequently movable outward to force the side portions of the blank outward and thereby draw down the upper end portion of the blank to start a fold therein, and an upper winged plate for replacing said lower end plate to press the various end folds of the blank against said block anew and to turn the surplus triangular ends at the sides back against the outside of the sides of the container thus formed on said block.

8. In a machine of the class described, a forming block about which a blank is adapted to be folded, means for wrapping the blank about said block and shaping and folding end portions against the end of said block with outstanding triangular portions, and a composite member for pressing the end portions against said block and turning said triangular portions back against the outside of the container, said member comprising two plates pivoted on a common axis and movable downward and inward toward the end of said block, one of said plates being yieldingly mounted so as normally to stand out away from its companion in position first to engage said blank in its downward movement, and said second plate having wings on its sides projecting toward said block which engage the blank after said yieldingly mounted plate and serve to press back said triangular portions as aforesaid.

9. In a machine of the class described, a forming block, a support upon which said block is slidably mounted, a spring tending to hold said block in extended position, yielding blades secured to said support and extending outward over faces of said block, and means for forcing said block backward against said spring whereby a container on said block with flaps extending toward said support has its flaps turned back against its sides by said blades.

10. In a machine of the class described, a forming block, a supporting arm in longitudinal alignment with said block, a longitudinally slidable connection between said arm and block, a spring tending to hold said block in extended position, flat longitudinally extending blades secured at their rear ends to said supporting arm and lying against faces of said block, and means for forcing said block inward against said spring to cause said blades to move forward relatively to said block to turn back flaps of a container being formed thereon.

11. In a machine of the class described, a rectangular forming block, a support, flat blades secured to said support and normally lying against faces of said block and having their outer ends thickened and beveled forwardly and outwardly of said block, said block having recesses in which said thickened ends normally rest, and means for giving said blades as a whole a forward movement relative to said block whereby said thickened ends pass out of said recesses and along the faces of said block to press back flaps of a container being formed thereon.

12. In a machine of the class described, a forming block, a movable member, clamping wings on opposite sides of said member for engaging opposite sides of a container on said block, means for moving said member up to and away from the end of said block, means for causing said wings to engage the container when said member is moved up to said block, and means for actuating said wings to free said container when said member has been moved away from said block far enough for the container to clear said block.

13. In a machine of the class described, a forming block, a movable member, clamping wings on opposite sides of said member for engaging opposite sides of a container on said block, means for moving said member up to and away from the end of said block, springs tending to force said wings into clamping position, the outer ends of said wings being outwardly curved so as to slip over the container on said block when moved to said block, and means for engaging projections on said wings to move them into disengaging position when said member is moved away from said block.

14. In a machine of the class described, a forming block adapted to hold an enveloping container, ejecting fingers movable along said block to assist in removing the container from said block, a pivoted support for said fingers, means for moving said support toward and from said block, and means including a frictional connection with said support for rocking the same to bring said fingers away from said block upon movement of said support toward said block and in an opposite direction upon movement of said support away from said block.

15. In a machine of the class described, a forming block adapted to hold an enveloping container, ejecting fingers movable along said block to assist in removing the container from said block, a pivoted support for said fingers, means for moving said support toward and from said block, a rod extending in the direction of the to and fro travel of said support, and an off-center frictional connection between said rod and support whereby the travel of said support toward said block causes said fingers to move away from said block and the travel of said support away from said block causes said fingers to engage said block.

16. In a machine of the class described, a forming block, a movable member, clamping wings on opposite sides of said member for engaging opposite sides of a container on said block, means for moving said member to and away from said block, ejecting fingers movable along said block to assist in removing the container from said block, said fingers being pivotally mounted on said member, means for causing said wings to engage the container when said member is moved to said block, means operative during the same movement of said block to rock said fingers away from said block and upon a reverse movement to rock them into engagement with said block, and means for causing said wings to move away from said block to free the container when said member has been moved away from said block a sufficient distance to free the container from said block.

17. In a machine of the class described, a forming block adapted to hold an enveloping container, a movable member, clamping wings on opposite sides of said member for engaging opposite sides of the container on said block, means for moving said member up to and away from said block, ejecting fingers movable along said block to assist in removing the container from said block, a pivoted support for said fingers on said member, springs tending to force said wings into clamping position, the outer ends of said wings being outwardly curved so as to slip over the container on the block when moved thereto, a rod extending in the direction of travel of said member, an off-center frictional connection between said rod and support operative to move the fingers toward said block upon an ejecting movement and vice versa, and means for engaging projections on said wings to move said wings away from said block at the extremity of the movement of said member away from said block.

18. In a machine of the class described, a supporting arm, a forming block mounted upon and movable lengthwise of said arm, a collar surrounding said arm and adjustable therealong, laterally yielding blades secured at one end to said collar and at the other end engaging faces of said block, and means for moving said block relative to said arm to cause the free ends of said blades to pass along the faces of said block to press back flaps of a container being formed thereon.

19. In a machine of the class described, a supporting arm, an aligned forming block movable toward and from said arm, a collar surrounding said arm and adjustable therealong, laterally yielding blades secured at one end to said collar and at the other end passing along and resting against faces of said block, each of said blades being thicker at its free end and there beveled on its inside outwardly and forwardly, and said block having recesses for said thickened ends, one set of recesses being located for an adjustment of said collar for containers of one size and another set for an adjustment of said collar for containers of another size.

20. A machine of the class described comprising a frame, a central vertical shaft journaled in said frame, a head rotatable on said shaft, four supporting arms extending outward from said head, forming blocks carried by and outwardly of said arms, means for intermittently driving said head from said shaft to stop said arms and blocks at four quiescent positions, means operative at one of said positions to wrap a blank of flexible lining material about each block as it rests there, means at a second position to fold in the ends of each blank as it presents itself, the third position permitting an attendant to slip a carton over the liner formed upon the block when in that position, and means at the fourth position for bending back the flaps of the container upon the side walls of the carton and ejecting the lined carton from the machine.

21. A machine of the class described comprising a frame, a central vertical shaft journaled in said frame, a head rotatable on said shaft, four supporting arms extending outward from said head, forming blocks carried by and outwardly of said arms, means for intermittently driving said head from said shaft to stop said arms and blocks at four quiescent positions, means operative at one of said positions to wrap a blank of flexible lining material about each block as it rests there, means at a second position to fold in the ends of each blank as it presents itself, the third position permitting an attendant to slip a carton over the liner formed upon the block when in that position, means at the fourth position for bending back the flaps of the container upon the side walls of the carton and ejecting the lined carton from the machine, and a clamping arm pivotally supported on said head and operated from said shaft to engage the folded edges of the blank at the first position and continue its clamping action until after the third position is passed.

22. In a machine of the class described, a forming block, means for intermittently driving said block to stop it at four quiescent positions, means for wrapping a blank of flexible lining material about said block while at one of said positions, means operative at a second position to fold in the ends of the blank against the block, said block with the formed container on it stopping at a third position to enable an attendant to slip a carton over the container, means for turning back the flaps of the liner and carton and discharging the lined carton at the fourth position, said turning means being adjustable to suit blanks and cartons of different sizes, and clamping means suited to blanks of said different sizes to engage the blank at the first position and to firmly hold it against said block continuously thereafter until after the carton has been slipped over the container.

23. A machine of the class described comprising a rectangular forming block, means for intermittently moving said block to stop it at a plurality of quiescent positions, means whereby a blank of flexible lining material may be readily wrapped about the sides of said block at one quiescent position, means whereby the blank may be readily folded about the outer end of said block at another of said positions, the unfolded end of the blank being slitted to form closing flaps for the top of the container being formed on said block, means for forcing said block inward at another of said positions, and means responsive to such inward movement to move along said block to bend said flaps and the corresponding flaps of a carton slipped over said container while on said block, back against the sides of said carton.

24. A machine of the class described comprising a rectangular forming block, means for moving said block to different operative positions, means at one of said positions for automatically wrapping a blank of flexible lining material about said blank and holding it there, means at another of said positions for automatically folding the ends of the blank about the exposed end of said block to form the bottom of a container, the unfolded ends of the blank being slitted to form closing flaps for the top of the container, means at still another of said positions, for automatically forcing said block inward, and means responsive to such inward movement to bend said flaps and the corresponding flaps of a carton slipped over said container while on said block, back against the sides of said carton.

25. In a machine of the class described, a protruding rectangular forming block upon which a lining container having overlapping sides may be located with end flaps extending away from the end of said block, a yielding clamping member for pressing said overlapping sides against said block, said member by its yieldingness permitting the slipping of a carton over said container on said block, said carton having end flaps overlying those on said lining container, means for raising said member from clamping position after said carton has been positioned, and means subsequently operative to turn back the flaps of the container and carton.

26. In a machine of the class described, a forming head, means for moving said head with a lined carton thereon to a discharge position, means for withdrawing the lined carton from said head in a horizontal direction and dropping it, means for engaging the carton to tip it right side up, and conveying means for moving the righted carton away from the machine.

27. In a machine of the class described, a forming head, means for moving said head with a lined carton thereon to a delivery position, means for withdrawing the lined carton from said head in a horizontal direction and dropping it, means for engaging the carton as it falls to tip it right side up, conveyor guides between which the carton lands, and means cooperating with said guides to advance the carton away from the machine.

28. In a machine of the class described, a forming head, means for moving said head with a lined carton thereon to a delivery position, means for withdrawing the lined carton from said head in a horizontal direction and dropping it, means for engaging the carton as it falls to tip it right side up, conveyor guides, a conveyor belt between said guides on which the cartons land, and means for moving said belt to carry the cartons away from the machine.

29. In a machine of the class described, a rotary forming block movable into an operative position, blank folding members cooperating with said block when in said position, a clamping member for engaging said block, a fixed cam operative to drop said clamping member into engagement with said block as soon as said block comes to rest in said position, a bridging cam mounted on said fixed cam, and a movable cam having a rotating center coincident with that of said forming block and operative to move said bridging cam to free said clamping member only after said folding members have completed the operation of wrapping a blank about said block.

30. In a machine of the class described, a vertical shaft, a head rotatable on said shaft, a forming block carried by said head, members for folding a blank of flexible material about said block, means for moving said head and block so as to bring said block into operative position above said members, a clamping arm movable down and up respectively into and out of engagement with said block to press the overlapping edges of the blank against the top of said block, a fixed cam for moving said arm arranged to move it into engagement with said block when said block comes to rest in said operative position, a movable bridging cam for holding said arm out of engagement with said block even when said block is at rest in said operative position, a cam on said shaft movable therewith to withdraw said bridging cam from engagement with said clamping arm, and means for operating said folding members to completely fold the blank about said block after the latter reaches said operative position and before said clamping arm is freed by the withdrawal of said bridging cam.

31. In a machine of the class described, a forming block, means for feeding the forward end of a web of flexible material to a given position beneath said block, a cutter for cutting off the forward end of the web to leave a blank in said position, and folding members operative from beneath said blank to raise the same vertically and wrap it about said block, said cutter in its elevated position lying distant from a point directly above the nearest end of said blank, whereby interference with the forming of the blank upon said block is avoided.

32. In a machine of the class described, a forming block, means for feeding the forward end of a web of flexible material to a given position beneath said block, a cutter for cutting off the forward end of the web to leave a blank in said position, and folding members operative from beneath said blank to raise the same vertically and wrap it about said block, the plane of the path of travel of the cutter receding upwardly from the plane through which the adjacent end of the blank is raised by said folding members, whereby the cutter in elevated position does not interfere with the forming of the blank upon said block.

33. In a machine of the class described, forming blocks secured to a rotatable head, blank forming members cooperating with said blocks when accurately positioned thereover, a fixed support, a carrier adjustable with reference to said support about the axis of rotation of said head, Geneva movement elements, one secured to said head and the other journaled in said carrier, and a stop arm having a terminal for accurately centering said first mentioned Geneva element, said arm being also journaled in said carrier.

34. In a machine of the class described, forming blocks secured to a rotatable head, blank forming members cooperating with said blocks when accurately positioned thereover, a fixed support, a carrier adjustable with reference to said support about the axis of rotation of said head, an intermittently rotating Geneva movement member secured to said head and having radial cam ways and a peripheral flange between said cam ways, a cooperating continuously rotating Geneva movement member journaled in said carrier and having oppositely disposed arms carrying cam rollers for traveling into and out of said cam ways, a spring pressed rotary member journaled in said carrier and having a cam roller at its free end operative to engage the end of each cam way as it presents itself and when the cam way is out of the path of travel of the cam roller to press against the inside of said flange, the operation of said continuously rotating member being in a direction to strike against said spring pressed rotary member to force its cam roller inward of said flange, and a stop for limiting the outward movement of said spring pressed rotary member when its cam roller lies in a cam way.

35. In a machine of the class described, a forming block adjacent to which a blank may be located, a clamping plate outward of said blank from said block, means for moving said clamping plate toward said block to push the central portion of the blank against said block, a pair of forming members each having an angle plate for fitting against two faces of said block, said angle plates being pivoted on axes extending lengthwise of said block, means for rocking said angle plates into and out of blank forming position against said block, auxiliary pivoted plates positioned between said angle plates and said block, and means for moving said auxiliary plates in advance of said angle plates to engage said blank first and force it against opposite sides of said block, leaving the angle plates to follow to complete the forming against the face of said block opposite said clamping plate.

36. In a machine of the class described, an angular forming block, an angular plate pivoted along one edge on an axis parallel to the axis of said block, the width of the web of said plate adjacent to said axis corresponding to the width of the cooperating adjacent face of said block and the outer web of said plate being positioned at an angle to the first web so as to extend along the next face of said block when said angular plate is closed against said block, an auxiliary plate pivoted on an axis parallel to the axis of said block and adapted to engage the adjacent face of said angular plate when the latter is moved into closed position against said block, and means for moving said plates to cause said auxiliary plate to engage the blank first and then said angular plate to engage the same as the plates are moved into closing position upon said block.

37. In a machine of the class described, a forming block, means for feeding the forward end of a web of flexible material to a given position adjacent to said block, a cutter for cutting off the forward end of the web to leave a blank in said position, and folding members operative to engage said blank and wrap the same about said block, said cutter in its elevated position lying distant from a point directly above the nearest end of said blank, whereby interference with the forming of the blank upon said block is avoided.

38. In a machine of the class described, a forming block, means for feeding the forward end of a web of flexible material to a given position adjacent to said block, a cutter for cutting off the forward end of the web to leave a blank in said position, and folding members operative to engage said blank by a vertical movement and wrap the same about said block, the plane of the path of travel of said cutter receding upwardly from the plane through which the adjacent end of the blank is moved by said folding members, whereby the cutter in elevated position does not interfere with the forming of the blank upon said block.

39. A machine of the class described comprising a forming block and a clamping member cooperating therewith to hold a blank wrapped about said block, said member engaging overlapping edges of the blank on the top of said block, a pair of blades movable to positions against the sides of the blank at the end of said block upon which the end folds are to be made, an end plate movable from beneath upward and inward toward the end of said block to bring the lower portion of the blank firmly against said end, means on said end plate for starting the downward fold of the upper portion of the blank, means for completing the downward fold of said upper portion, means for withdrawing said blades and end plate, and means for continuing the action of said clamping member to hold said overlapping edges together and the blank on said block during these end folding operations.

40. A machine of the class described comprising a forming block and means for holding a blank wrapped about said block, a pair of blades movable to positions against the sides of the blank at the end of said block upon which the end folds are to be made, an end plate movable against the end of said block to make the first end fold by bringing a portion of the blank flat against said end, means on said end plate for drawing upon portions of the blank end to start a fold along an edge opposite the first fold, and means independent of said end plate for completing said started fold.

41. A machine of the class described comprising a forming block and means for holding a blank wrapped about said block, a pair of blades movable to positions against the sides of the blank at the end of said block upon which the end folds are to be made, an end plate movable to the end of said block to bring a portion of the blank firmly against said end, wings of said end plate movable outward after said first fold has been made by said end plate to force other portions of the blank outward and thereby start a fold along the edge opposite the first fold, another winged plate movable against the folded end of the blank, and means for withdrawing said blades and plates.

42. A machine of the class described comprising a forming block, means for moving said block into and out of a working position where a hand operation is to be performed, a clamping arm movable toward and from said block, a head pivoted to said arm and having a plurality of fingers extending toward said block, and rollers journaled in the ends of said fingers to rest against the container or carton on said block, whereby an attendant may in said working position readily slip a carton over the end of a container on said block, one side of the carton slipping readily under and being held by said rollers.

43. A machine of the class described comprising a rotatable block, means for rotating said block into a plurality of working positions and allowing the same to rest a short interval in each said position, a clamping arm movable vertically toward and from said block, a head pivoted to said arm and extending lengthwise of said block and having a plurality of fingers extending toward said block, and rollers at the ends of said fingers for engaging a blank on said block formed into a lining container to hold the same while a carton is being slipped over the container on the block; said arm, head and fingers being yieldingly mounted whereby one wall of the carton will pass under said rollers and the lined carton will be held on said block during subsequent moving of the same.

In witness whereof, I hereunto subscribe my name this 30th day of April, A. D. 1926.

HARLEY R. PHILLIPS.